United States Patent
Ochi et al.

(10) Patent No.: US 11,149,102 B2
(45) Date of Patent: Oct. 19, 2021

(54) FILM

(71) Applicant: Sumitomo Chemical Company, Limited, Tokyo (JP)

(72) Inventors: Naoko Ochi, Ichihara (JP); Tomokazu Yasunaga, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 85 days.

(21) Appl. No.: 16/489,377

(22) PCT Filed: Mar. 7, 2018

(86) PCT No.: PCT/JP2018/008712
§ 371 (c)(1),
(2) Date: Aug. 28, 2019

(87) PCT Pub. No.: WO2018/164169
PCT Pub. Date: Sep. 13, 2018

(65) Prior Publication Data
US 2019/0382515 A1 Dec. 19, 2019

(30) Foreign Application Priority Data

Mar. 10, 2017 (JP) .............. JP2017-045771

(51) Int. Cl.
*C08F 210/16* (2006.01)
*B32B 27/32* (2006.01)
*C08L 23/08* (2006.01)
*C08L 101/00* (2006.01)

(52) U.S. Cl.
CPC ............ *C08F 210/16* (2013.01); *B32B 27/32* (2013.01); *C08L 23/0815* (2013.01); *C08L 101/00* (2013.01); *B32B 2439/00* (2013.01); *C08L 2201/10* (2013.01); *C08L 2203/16* (2013.01); *C08L 2205/025* (2013.01)

(58) Field of Classification Search
CPC .... C08F 210/16; C08L 23/16; C08L 2203/16; C08L 2201/10; C08L 2205/025; B32B 27/32
See application file for complete search history.

(56) References Cited

U.S. PATENT DOCUMENTS

| | | | |
|---|---|---|---|
| 6,191,227 B1* | 2/2001 | Matsuoka | C08F 10/02 525/240 |
| 6,426,384 B1 | 7/2002 | Nishimura et al. | |
| 8,299,193 B2* | 10/2012 | Suzuki | B32B 27/08 526/348.6 |
| 8,815,357 B1* | 8/2014 | Inn | C08F 4/65925 428/35.7 |
| 8,937,139 B2* | 1/2015 | Hlavinka | C07F 7/003 526/211 |
| 9,068,033 B2* | 6/2015 | Fiscus | C08L 23/0815 |
| 9,102,819 B2* | 8/2015 | Kapur | C08J 5/18 |
| 9,181,370 B2* | 11/2015 | Sukhadia | C08F 4/65904 |
| 9,493,589 B1* | 11/2016 | Greco | C08F 210/16 |
| 9,828,476 B2* | 11/2017 | Bensason | B32B 27/205 |
| 9,873,782 B2* | 1/2018 | Cottle | C08L 23/0815 |
| 10,000,594 B2* | 6/2018 | Hlavinka | C08F 210/16 |
| 2008/0146761 A1 | 6/2008 | Kawashima et al. | |
| 2012/0059134 A1* | 3/2012 | Yang | C08F 4/64148 526/113 |
| 2013/0284486 A1 | 10/2013 | Nilsson et al. | |
| 2014/0256899 A1* | 9/2014 | Tso | C08L 23/0807 526/348 |
| 2014/0342141 A1* | 11/2014 | Cui | B29C 48/022 428/220 |
| 2015/0376358 A1 | 12/2015 | Kin et al. | |
| 2017/0101490 A1 | 4/2017 | Ishihama et al. | |

FOREIGN PATENT DOCUMENTS

| | | |
|---|---|---|
| EP | 0525403 A1 | 2/1993 |
| EP | 3260294 A1 | 12/2017 |
| JP | H11181173 A | 7/1999 |
| JP | 2004346304 A | 12/2004 |
| JP | 2006233207 A | 9/2006 |
| JP | 2007118576 A | 5/2007 |
| JP | 2008106264 A | 5/2008 |
| JP | 201231398 A | 2/2012 |
| JP | 2014502005 A | 1/2014 |
| JP | 2014029989 A | 2/2014 |
| JP | 2015107612 A | 6/2015 |
| JP | 2015127431 A | 7/2015 |
| JP | 2016518507 A | 6/2016 |
| JP | 2020-139123 A * | 9/2020 |
| WO | 9409060 A1 | 4/1994 |
| WO | 2014129511 A1 | 8/2014 |
| WO | 2015152266 A1 | 10/2015 |
| WO | 2016133012 A1 | 8/2016 |

OTHER PUBLICATIONS

International Search Report dated Jun. 5, 2018 in International Application No. PCT/JP2018/008712.
Yoshida, "Surface roughness—Part 2 Slightly rare to use Various surface texture parameters", Journal of the Japan Society for Precision Engineering, vol. 79, No. 5, p. 405-409, 2013.
Extended European Search Report dated Dec. 21, 2020 in EP Application No. 18764901.7.

* cited by examiner

*Primary Examiner* — Rip A Lee
(74) *Attorney, Agent, or Firm* — Panitch Schwarze Belisario & Nadel LLP

(57) ABSTRACT

A film including a resin component is provided. The resin density is 900 kg/m³ or more and 930 kg/m³ or less. The load length ratio (Tp(50)) at cutting level 50% of the surface roughness curve of at least one film surface is 0.01% or more and 29.0% or less.

13 Claims, No Drawings

FILM

CROSS-REFERENCE TO RELATED APPLICATIONS

This application is a Section 371 of International Application No. PCT/JP2018/008712, filed Mar. 7, 2018, which was published in the Japanese language on Sep. 13, 2018, under International Publication No. WO 2018/164169 A1, which claims priority under 35 U.S.C. § 119(b) to Japanese Application No. 2017-045771, filed Mar. 10, 2017, the disclosures of which are incorporated herein by reference in their entirety.

TECHNICAL FIELD

The present invention relates to a film and a packaging container comprising the film.

BACKGROUND ART

Patent Document 1 describes a film composed of a resin composition containing an ethylene-α-olefin copolymer and a low density polyethylene obtained by a high pressure radical polymerization method.

PRIOR ART DOCUMENT

Patent Document

Patent Document 1: Japanese Unexamined Patent Application Publication (JP-A) No. 11-181173

SUMMARY OF THE INVENTION

Problem to be Solved by the Invention

However, the conventional film containing an ethylene-α-olefin copolymer had no sufficient slipperiness.

Under such conditions, the problem to be solved by the present invention is to provide a film excellent in slipperiness and an ethylene-α-olefin copolymer capable of improving the slipperiness of a film comprising an ethylene-based polymer with small addition amount thereof to the ethylene-based polymer.

Means for Solving the Problem

The present invention provides the following [1] to [18].

[1] A film comprising a resin component, wherein
the resin density is 900 kg/m$^3$ or more and 930 kg/m$^3$ or less, and
the load length ratio (Tp(50)) at cutting level 50% of the surface roughness curve of at least one film surface is 0.01% or more and 29.0% or less.

[2] The film according to [1], wherein the resin density is 900 kg/m$^3$ or more and less than 920 kg/m$^3$.

[3] The film according to [1], wherein the resin density is 920 kg/m$^3$ or more and 930 kg/m$^3$ or less.

[4] The film according to any one of [1] to [3], wherein the load length ratio (Tp(50)) at cutting level 50% of the surface roughness curve of at least one film surface is 0.05% or more and 26% or less.

[5] The film according to any one of [1] to [4], wherein the content of a lubricant and/or an anti-blocking agent is 200 ppm by weight or less.

[6] A multi-layered film comprising a layer α composed of the film according to any one of [1] to [5], wherein
at least one surface layer of two surface layers of the multi-layered film is the layer α.

[7] The multi-layered film according to [6], comprising a layer β containing an ethylene-based polymer, provided that the layer β is different from the layer α.

[8] The multi-layered film according to [6] or [7], comprising a layer γ containing no ethylene-based polymer, provided that the layer γ is different from the layer α.

[9] A packaging container comprising the film according to any one of [1] to [5].

[10] A packaging container comprising the multi-layered film according to any one of [6] to [8].

[11] An ethylene-α-olefin copolymer comprising a monomer unit based on ethylene and a monomer unit based on an α-olefin having 3 to 20 carbon atoms, wherein the density is 915 kg/m$^3$ or more and 950 kg/m$^3$ or less, the melt flow rate measured under conditions of a temperature of 190° C. and a load of 21.18 N is 0.0001 g/10 min or more and 0.2 g/10 min or less, and the zero shear viscosity at a temperature of 190° C. is 1×10$^5$ Pa·sec or more and 1×10$^7$ Pa·sec or less.

[12] An ethylene-based resin composition comprising a component (A) which is the ethylene-α-olefin copolymer according to [11] and the following component (B), wherein the content of the component (A) is 1% by weight or more and 30% by weight or less with respect to 100% by weight of the total amount of the component (A) and the component (B):

component (B): an ethylene-α-olefin copolymer comprising a monomer unit based on ethylene and a monomer unit based on an α-olefin having 3 to 20 carbon atoms, wherein the density is 890 kg/m$^3$ or more and 930 kg/m$^3$ or less, the melt flow rate measured under conditions of a temperature of 190° C. and a load of 21.18 N is 0.5 g/10 min or more and 5 g/10 min or less, and the following melt flow rate ratio is 10 or more and 30 or less:

melt flow rate ratio: the ratio of the melt flow rate measured under conditions of a temperature of 190° C. and a load of 211.82 N to the melt flow rate measured under conditions of a temperature of 190° C. and a load of 21.18 N.

[13] The ethylene-based resin composition according to [12] according to [8], further comprising the following component (C), wherein
the content of the component (C) is 1% by weight or more and 50% by weight or less with respect to 100% by weight of the total amount of the component (A), the component (B) and the component (C):

component (C): one or more ethylene-based polymers selected from the group consisting of the following component (D) and the following component (E):

component (D): a high pressure low density polyethylene in which the density is 890 kg/m$^3$ or more and 930 kg/m$^3$ or less, the melt flow rate measured under conditions of a temperature of 190° C. and a load of 21.18 N is 0.5 g/10 min or more and 5 g/10 min or less, and the following melt flow rate ratio is 31 or more and 150 or less:

component (E): an ethylene-α-olefin copolymer comprising a monomer unit based on ethylene an a monomer unit based on an α-olefin having 3 to 20 carbon atoms, wherein the density is 890 kg/m$^3$ or more and 930 kg/m$^3$ or less, the melt flow rate measured under conditions of a temperature of 190° C. and a load of 21.18 N is 0.5 g/10 min or more and 5 g/10 min or less, and the following melt flow rate ratio is 31 or more and 150 or less:

melt flow rate ratio: the ratio of the melt flow rate measured under conditions of a temperature of 190° C. and a load of 211.82 N to the melt flow rate measured under conditions of a temperature of 190° C. and a load of 21.18 N.

[14] The ethylene-based resin composition according to [12] or [13], wherein the content of a lubricant and/or an anti-blocking agent is 200 ppm by weight or less.

[15] A film comprising the ethylene-based resin composition according to any one of [12] to [14].

[16] A multi-layered film comprising a layer containing the ethylene-based resin composition according to any one of [12] to [14] and a layer containing an ethylene-based polymer, wherein at least one surface layer of two surface layers of the multi-layered film is a layer composed of the ethylene-based resin composition according to any one of [12] to [14].

[17] A multi-layered film comprising a layer composed of the ethylene-based resin composition according to any one of [12] to [14] and a layer containing no ethylene-based polymer,
wherein at least one surface layer of two surface layers of the multi-layered film is a layer composed of the ethylene-based resin composition according to any one of [12] to [14].

[18] Use of the ethylene-α-olefin copolymer according to [11] for improving the slipperiness of a film.

Effect of the Invention

According to the present invention, a film excellent in slipperiness can be provided. Further, the ethylene-α-olefin copolymer of the present invention is capable of improving the slipperiness of a film comprising an ethylene-based polymer with small addition amount thereof to the ethylene-based polymer.

MODES FOR CARRYING OUT THE INVENTION

Definition

In the present specification, the following terms are defined or explained as described below.

The "ethylene-based polymer" is a polymer comprising a monomer unit based on ethylene, wherein the content of the monomer unit based on ethylene is 50% by weight or more with respect to 100% by weight of the total weight of the polymer.

The "ethylene-α-olefin copolymer" is a copolymer comprising a monomer unit based on ethylene and a monomer unit based on an α-olefin, wherein the total amount of the monomer unit based on ethylene and the monomer unit based on an α-olefin is 95% by weight or more with respect to 100% by weight of the total weight of the copolymer.

The "α-olefin" is a linear or branched olefin having a carbon-carbon unsaturated double bond at the position α.

The "ethylene-based resin composition" refers to a composition containing an ethylene-based polymer.

The "high pressure low density polyethylene" refers to a polymer having a density of 930 kg/m³ or less, produced by polymerizing ethylene, or ethylene and a small amount of a copolymerization component by radical polymerization under a pressure of 100 to 400 mPa.

The "lubricant" refers to an agent having an action of reducing the friction coefficient of a material to which the agent is added.

The "anti-blocking agent" refers to an agent having a function of preventing the films from sticking to each other, sticking or fusing and not peeling off during storage or use of the film.

In the present specification, the density is a value measured according to the method A prescribed in JIS K7112-1980 after performing annealing described in JIS K6760-1995.

In the present specification, the melt flow rate (hereinafter, described as MFR in some cases; unit is g/10 min) is a value measured under conditions of a temperature of 190° C. and a load of 21.18 N according to a method prescribed in JIS K7210-1995.

In the present specification, the melt flow rate ratio (hereinafter, described as MFRR in some cases) is the ratio of the melt flow rate measured under conditions of a temperature of 190° C. and a load of 211.82 N to the melt flow rate measured under conditions of a temperature of 190° C. and a load of 21.18 N.

In the present specification, the number-average molecular weight (hereinafter, described as Mn in some cases), the weight-average molecular weight (hereinafter, described as Mw in some cases) and the z-average molecular weight (hereinafter, described as Mz in some cases) are determined by a gel permeation chromatograph (GPC) method. Measurement of GPC is conducted under the following conditions (1) to (8).

(1) Apparatus: Waters 150C manufactured by Waters
(2) Separation column: TOSOH TSKgelGMH$_6$-HT
(3) Measurement temperature: 140° C.
(4) Carrier: orthodichlorobenzene
(5) Flow rate: 1.0 mL/min
(6) Injection amount: 500 μL
(7) Detector: differential refractometer
(8) Molecular weight standard substance: standard polystyrene <Film>

The film according to the present invention comprises a resin component.

It is a film in which the resin density is 900 kg/m³ or more and 930 kg/m³ or less and the load length ratio (Tp(50)) at cutting level 50% of the surface roughness curve of at least one film surface is 0.01% or more and 29.0% or less.

In the present specification, the "resin density" refers to the density of a resin component contained in the film. The film may contain an inorganic component. When the film does not contain an inorganic component, the density of the film is taken as the resin density of the film. In the case of a film comprising a resin component and an inorganic component, the resin density of the film is the density of the resin component obtained by removing the inorganic substance from the film.

The resin component refers to a component other than the inorganic component in the film.

In the film according to the present invention, the load length ratio (Tp(50)) at cutting level 50% of the surface roughness curve of at least one film surface is 0.01% or more and 29.0% or less.

The load length ratio of the surface roughness curve is determined according to a method prescribed in JIS B0601-1994. The load length ratio (Tp(50)) at cutting level 50% is determined by setting the cutting level c described in JIS B0601-1994 to 50%.

Tp(50) is an index that represents the roughness of the film surface. When the Tp(50) value is small, it means that irregularities on the film surface are sparsely dispersed.

The Tp(50) of the film is preferably 0.05% or more and 26% or less, more preferably 0.1% or more and 23% or less, further preferably 0.5% or more and 20% or less.

The arithmetic mean roughness Ra determined by a method prescribed in JIS B0601-1994 of the film is preferably 0.01 µm or more and 1 µm or less, more preferably 0.02 µm or more and 0.5 µm or less, further preferably 0.03 µm or more and 0.2 µm or less, from the standpoint of slipperiness.

The maximum height roughness Ry determined by a method prescribed in JIS B0601-1994 of the film is preferably 0.1 µm or more and 5 µm or less, more preferably 0.2 µm or more and 2 µm or less, further preferably 0.3 µm or more and 1.5 µm or less, from the standpoint of slipperiness.

As one embodiment of the present invention, a film is mentioned in which the resin density is 900 kg/m$^3$ or more and less than 920 kg/m$^3$ and the load length ratio (Tp(50)) at cutting level 50% of the surface roughness curve of the film surface is 0.01% or more and 29.0% or less. The film is excellent in low temperature heat sealability.

As one embodiment of the present invention, a film is mentioned in which the resin density is 920 kg/m$^3$ or more and 930 kg/m$^3$ or less and the load length ratio (Tp(50)) at cutting level 50% of the surface roughness curve of the film surface is 0.01% or more and 29.0% or less. The film is more excellent in slipperiness.

It is preferable that the film contains, for example, the following component (A) and the following component (B).

Component (A): an ethylene-α-olefin copolymer comprising a monomer unit based on ethylene and a monomer unit based on an α-olefin having 3 to 20 carbon atoms, wherein the density is 915 kg/m$^3$ or more and 950 kg/m$^3$ or less, MFR is 0.0001 g/10 min or more and 0.2 g/10 min or less, and the zero shear viscosity at a temperature of 190° C. is 1×10$^5$ Pa·sec or more and 1×10$^7$ Pa·sec or less.

Component (B): an ethylene-α-olefin copolymer comprising a monomer unit based on ethylene and a monomer unit based on an α-olefin having 3 to 20 carbon atoms, wherein the density is 890 kg/m$^3$ or more and 930 kg/m$^3$ or less, MFR is 0.5 g/10 min or more and 5 g/10 min or less, and MFRR is 10 or more and 30 or less.

The content of the component (A) in the film is preferably 1% by weight or more and 30% by weight or less, more preferably 2% by weight or more and 20% by weight or less, further preferably 3% by weight or more and 15% by weight or less, with respect to 100% by weight of the resin component in the film.

The content of the component (B) in the film is preferably 50% by weight or more and 99% by weight or less, more preferably 55% by weight or more and 97% by weight or less, further preferably 60% by weight or more and 95% by weight or less, with respect to 100% by weight of the resin component in the film.

It is preferable that the film further contains the following component (C).

Component (C): at least one ethylene-based polymer selected from the group consisting of a high pressure low density polyethylene (hereinafter, described as component (D) in some cases) in which the density is 890 kg/m$^3$ or more and 930 kg/m$^3$ or less, MFR is 0.5 g/10 min or more and 5 g/10 min or less, and MFRR is 31 or more and 150 or less and an ethylene-α-olefin copolymer (hereinafter, described as component (E) in some cases) comprising a monomer unit based on ethylene and a monomer unit based on an α-olefin having 3 to 20 carbon atoms, wherein the density is 890 kg/m$^3$ or more and 930 kg/m$^3$ or less, MFR is 0.5 g/10 min or more and 5 g/10 min or less, and MFRR is 31 or more and 150 or less.

The content of the component (C) in the film is preferably 1% by weight or more and 50% by weight or less, more preferably 5% by weight or more and 40% by weight or less, further preferably 10% by weight or more and 30% by weight or less, with respect to 100% by weight of the resin component of the film.

The resin density of the film can be controlled by adjusting the content or density of the component (A), the component (B) or the component (C) in the film.

If the content of the component (A) is 5% by weight or more and 20% by weight or less, the content of the component (B) is 65% by weight or more and 95% by weight or less and the content of the component (C) is 0% by weight or more and 15% by weight or less, with respect to 100% by weight of the resin component in the film, then the resin density of the film can be 900 kg/m$^3$ or more and 930 kg/m$^3$ or less.

If the density of the component (A) contained in the film is 900 kg/m$^3$ or more and 930 kg/m$^3$ or less, the density of the component (B) is 900 kg/m$^3$ or more and 930 kg/m$^3$ or less and the density of the component (C) is 900 kg/m$^3$ or more and 930 kg/m$^3$ or less, then the resin density of the film can be 900 kg/m$^3$ or more and 930 kg/m$^3$ or less.

If the density of the component (A) contained in the film is 900 kg/m$^3$ or more and 928 kg/m$^3$ or less, the density of the component (B) is 900 kg/m$^3$ or more and 915 kg/m$^3$ or less and the density of the component (C) is 900 kg/m$^3$ or more and 928 kg/m or less, then the resin density of the film can be 900 kg/m$^3$ or more and less than 920 kg/m$^3$.

If the density of the component (A) contained in the film is 922 kg/m$^3$ or more and 930 kg/m$^3$ or less, the density of the component (B) is 919 kg/m$^3$ or more and 930 kg/m$^3$ or less and the density of the component (C) is 922 kg/m$^3$ or more and 930 kg/m$^3$ or less, then the resin density of the film can be 920 kg/m$^3$ or more and 930 kg/m$^3$ or less.

The Tp(50) of the film can be controlled, by adjusting the content of the component (A) contained in the film, adjusting the lip gap of a die at the time of formation of the film or adjusting the film withdrawing speed.

The Tp(50) of the film can be 0.01% or more and 29.0% or less, by adjusting the content of the component (A) to 5 to 20% by weight, with respect to 100% by weight of the resin component in the film.

The film may contain a lubricant and/or an anti-blocking agent.

Further, for example, an antioxidant, a neutralizing agent, a weathering agent, an anti-static agent, an anti-fogging agent, an anti-drop agent, a pigment or a filler may also be contained as an additive.

It is preferable that the film has a content of a lubricant and/or an anti-blocking agent of 200 ppm by weight or less. The content of a lubricant and/or an anti-blocking agent in the film is more preferably 100 ppm by weight or less, further preferably 50 ppm by weight or less, particularly preferably 30 ppm by weight or less. It is preferable that the film contains substantially no lubricant and/or anti-blocking agent.

It is preferable that the film according to the present invention has a haze of 4 to 18%, from the standpoint of slipperiness.

The haze is measured according to a method prescribed in ASTM D1003.

The external haze is a difference between the haze and the internal haze. The internal haze is measured according to a method prescribed in ASTM D1003 with dimethyl phthalate filled in a quartz glass cell and the film immersed in dimethyl phthalate. The external haze is an index that represents the roughness of the film surface.

The film according to the present invention may be a single-layered film in which the resin density is 900 kg/m$^3$ or more and 930 kg/m$^3$ or less and the load length ratio (Tp(50)) at cutting level 50% of the surface roughness curve is 0.01% or more and 29.0% or less.

<Multi-Layered Film>

The multi-layered film according to the present invention may be a multi-layered film containing a layer (hereinafter, described as layer α in some cases) composed of a film in which the resin density is 900 kg/m$^3$ or more and 930 kg/m$^3$ or less and the load length ratio (Tp(50)) at cutting level 50% of the surface roughness curve is 0.01% or more and 29.0% or less wherein at least one surface layer of two surface layers of the multi-layered film is the layer α.

One embodiment of the present invention may also be a multi-layered film comprising a layer α and a layer β containing an ethylene-based polymer (provided that, the layer β is different from the layer α) wherein at least one surface layer of two surface layers of the multi-layered film is the layer α.

One embodiment of the present invention may also be a multi-layered film comprising a layer α and a layer γ not containing an ethylene-based polymer (provided that, the layer γ is different from the above-described layer α) wherein at least one surface layer of two surface layers of the multi-layered film is the layer α.

In the above-described multi-layered film, the ethylene-based polymer contained in the layer β includes, for example, a high pressure low density polyethylene, and an ethylene-α-olefin copolymer containing no component (A).

In the above-described multi-layered film, the material constituting the layer γ includes, for example, cellophane, paper, paperboard, textile, aluminum foil, polyamide resins such as nylon 6, nylon 66 and the like, polyester resins such as polyethylene terephthalate, polybutylene terephthalate and the like, and polypropylene resins.

As the multi-layered film comprising a layer α and a layer γ in which at least one surface layer of two surface layers of the multi-layered film is the layer α, for example, a double-layered film comprising a layer α and a layer γ in which one surface layer is the layer α and another surface layer is the layer γ is mentioned.

As the multi-layered film comprising a layer α and a layer γ in which at least one surface layer of two surface layers of the multi-layered film is the layer α, for example, a multi-layered film comprising a layer α, a layer β and a layer γ in which one surface layer is the layer α and another surface layer is the layer γ is mentioned.

The method for producing a single-layered film and a multi-layered film includes, for example, extrusion molding methods such as an inflation film molding method, a T die film molding method and the like, and an injection molding method and a compression molding method. The method for producing a single-layered film and a multi-layered film is preferably an inflation film molding method.

When the multi-layered film is a multi-layered film comprising a layer α and a layer γ, the method for producing the multi-layered film includes, for example, a lamination method of laminating a single-layered film composed only of a layer α or a multi-layered film comprising a layer α and a layer β onto a layer γ. The lamination method includes, for example, a dry laminate method, a wet laminate method and a sand laminate method. The lamination method is preferably a dry laminate method.

The multi-layered film of the present invention can be used as a packaging container and used for packaging various contents. The contents include, for example, foods, beverages, seasonings, milk and the like, dairy products, medicines, electronic components such as semiconductor products, pet foods, pet care products, detergents and toiletries.

<Component (A)>

The α-olefin having 3 to 20 carbon atoms forming the monomer unit based on an α-olefin having 3 to 20 carbon atoms in the component (A) includes propylene, 1-butene, 1-pentene, 1-hexene, 1-heptene, 1-octene, 1-nonene, 1-decene, 1-dodecene, 4-methyl-1-pentene and 4-methyl-1-hexene. The component (A) may contain only one or two or more of these monomer unit based on an α-olefin having 3 to 20 carbon atoms. The α-olefin having 3 to 20 carbon atoms is preferably 1-hexene, 4-methyl-1-pentene or 1-octene, more preferably 1-hexene or 1-octene.

It is preferable that the content of the monomer unit based on ethylene in the component (A) is 80 to 97% by weight, with respect to 100% by weight of the total weight of the component (A). Further, it is preferable that the content of the monomer unit based on an α-olefin is 3 to 20% by weight, with respect to 100% by weight of the total weight of the component (A).

The component (A) may contain a monomer unit based on a monomer other than ethylene and the α-olefin having 3 to 20 carbon atoms. The monomer other than ethylene and the α-olefin having 3 to 20 carbon atoms includes, for example, conjugated dienes such as butadiene, isoprene or the like; non-conjugated dienes such as 1,4-pentadiene or the like; acrylic acid; acrylic acid esters such as methyl acrylate, ethyl acrylate or the like; methacrylic acid; methacrylic acid esters such as methyl methacrylate, ethyl methacrylate or the like; and vinyl acetate.

The component (A) is preferably a copolymer comprising a monomer unit based on ethylene and a monomer unit based on an α-olefin having 4 to 20 carbon atoms, more preferably a copolymer comprising a monomer unit based on ethylene and a monomer unit based on an α-olefin having 5 to 20 carbon atoms, further preferably a copolymer comprising a monomer unit based on ethylene and a monomer unit based on an α-olefin having 6 to 20 carbon atoms.

The component (A) includes, for example, an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer and an ethylene-1-butene-1-octene copolymer. The component (A) is preferably an ethylene-1-hexene copolymer, an ethylene-4-methyl-1-pentene copolymer, an ethylene-1-butene-1-hexene copolymer, an ethylene-1-butene-4-methyl-1-pentene copolymer, an ethylene-1-octene copolymer, an ethylene-1-hexene1-octene copolymer or an ethylene-1-butene-1-octene copolymer, more preferably an ethylene-1-hexene copolymer, an ethylene-1-octene copolymer, an ethylene-1-butene-1-hexene copolymer or an ethylene-1-butene-1-octene copolymer, further preferably an ethylene-1-hexene copolymer or an ethylene-1-butene-1-hexene copolymer.

The density of the component (A) is preferably 918 kg/m$^3$ or more, more preferably 921 kg/m$^3$ or more, further preferably 924 kg/m$^3$ or more, from the standpoint of more improving the slipperiness of the film. The density of the component (A) is preferably 945 kg/m$^3$ or less, more preferably 940 kg/m³ or less, further preferably 930 kg/m³ or less, from the standpoint of reducing appearance defects such as film fish eye.

In one embodiment, the density of the component (A) is 918 kg/m³ or more and 945 kg/m or less, in another embodiment, the density of the component (A) is 921 kg/m³ or more and 940 kg/m³ or less, and in yet another embodiment, the density of the component (A) is 924 kg/m³ or more and 930 kg/m³ or less.

The MFR of the component (A) is preferably 0.0005 g/10 min or more, more preferably 0.001 g/10 min or more, from the standpoint of reducing extrusion load at the time of formation of the film. The MFR of the component (A) is preferably 0.1 g/10 min or less, more preferably 0.08 g/10 min or less, further preferably 0.05 g/10 min or less, from the standpoint of more improving the slipperiness of the film.

In one embodiment, the MFR of the component (A) is 0.0005 g/10 min or more and 0.1 g/10 min or less, in another embodiment, the MFR of the component (A) is 0.001 g/10 min or more and 0.08 g/10 min or less, and in yet another embodiment, the MFR of the component (A) is 0.003 g/10 min or more and 0.05 g/10 min or less. In measurement of the MFR of the component (A), usually, a sample in which about 1000 ppm of an antioxidant is blended in the component (A) is used.

The zero shear viscosity at a temperature of 190° C. (hereinafter, expressed as $\eta^0$; unit is Pa·sec) of the component (A) is preferably $2\times10^5$ Pa·sec or more, more preferably $3\times10^5$ Pa·sec or more, further preferably $5\times10^5$ Pa·sec or more, from the standpoint of more improving the slipperiness of the film. The $\eta^0$ of the component (A) is preferably $5\times10^6$ Pa·sec or less, more preferably $3\times10^6$ Pa·sec or less, further preferably $1\times10^6$ Pa·sec or less, from the standpoint of reducing extrusion load at the time of formation of the film.

In one embodiment, the $\eta^0$ of the component (A) is $2\times10^5$ Pa·sec or more and $5\times10^6$ Pa·sec or less, in another embodiment, the $\eta^0$ of the component (A) is $3\times10^5$ Pa·sec or more and $3\times10^6$ Pa·sec or less, and in yet another embodiment, the $\eta^0$ of the component (A) is $5\times10^5$ Pa·sec or more and $1\times10^6$ Pa·sec or less.

The component (A) is obtained by copolymerizing ethylene and an α-olefin by a slurry polymerization method or a gas phase polymerization method, in the presence of a polymerization catalyst obtained by bringing a cocatalyst support (hereinafter, described as component (H)), a metallocene-based complex, an organic aluminum compound and an electron donating compound as described below into contact with each other. In the copolymerization, the $\eta^0$ of the resulting component (A) can be $1\times10^5$ Pa·sec or more and $1\times10^7$ Pa·sec or less, by adjusting the ratio of the electron-donating compound to 2 to 50 mol % with respect to 100 mol % of the organic aluminum compound in the polymerization catalyst and adjusting the ratio of hydrogen to 0.01 to 1.1 mol % with respect to 100 mol % of ethylene.

The $\eta^0$ at a temperature of 190° C. is a value calculated by fitting Carreau-Yasuda model represented by the following formula (1) to a shear viscosity at a measurement temperature of 190° C. ($\eta^*$; unit is Pa·sec)–angular frequency ($\omega$, unit is rad/sec) curve by a nonlinear least square method.

$$\eta^* = \eta^0 (1+(\lambda\omega)^a)^{(n-1)/a} \tag{1}$$

λ: time constant
a: breadth parameter
n: power-law index

The shear viscosity is measured using a viscoelasticity measuring apparatus (for example, Rheometrics Mechanical Spectrometer RMS800 manufactured by Rheometrics, and the like) usually under conditions of geometry: parallel plate, plate diameter: 25 mm, thickness of measurement sample: about 2.0 mm, angular frequency: 0.1 to 100 rad/sec, and measurement point: 5 points per ω digit. The amount of distortion is appropriately selected in the range of 3 to 10% so that torque in the measurement range can be detected and torque over will not occur. The measurement sample is prepared by pressing at a pressure of 2 MPa for 5 minutes with a 150° C. heat press, followed by cooling for 5 minutes with a 30° C. cooling press, and pressing to a thickness of 2 mm.

The activation energy of the flow (hereinafter, expressed as Ea; unit is kJ/mol) of the component (A) is preferably 50 kJ/mol or more, more preferably 60 kJ/mol or more, further preferably 70 kJ/mol or more, from the standpoint of more improving the slipperiness of the film. Further, the Ea of the component (A) is preferably 120 kJ/mol or less, more preferably 110 kJ/mol or less, further preferably 100 kJ/mol or less, from the standpoint of reducing extrusion load at the time of formation of the film. In one embodiment, the Ea of the component (A) is 50 kJ/mol or more and 120 kJ/mol or less, in another embodiment, the Ea of the component (A) is 60 kJ/mol or more and 110 kJ/mol or less, and in yet another embodiment, the Ea of the component (A) is 70 kJ/mol or more and 100 kJ/mol or less.

The activation energy of the flow (Ea) is a numerical value calculated by the Arrhenius equation from the shift factor ($a_T$) at the time of preparing a master curve showing dependence of melt complex viscometer at 190° C. (unit is Pa·sec) on angular frequency (unit is rad/sec), based on the temperature-time superposition principle. The Ea is a value determined by the following method. Melt complex viscosity-angular frequency curves of an ethylene-α-olefin copolymer at respective temperatures of 130° C., 150° C., 170° C. and 190° C. (written as T; unit: ° C.) are each superposed on a melt complex viscosity-angular frequency curve of an ethylene-α-olefin copolymer at 190° C. based on the temperature-time superposition principle, and the shift factor ($a_T$) at each temperature (T) is obtained. A first-order approximation of [ln($a_T$)] and [1/(T+273.16)] (the following formula (I)) is calculated from each temperature (T) and the shift factor ($a_T$) at each temperature (T) by a least square method, and the Ea is determined from the slope m of the first-order equation and the following formula (II).

$$\ln(a_T) = m(1/(T+273.16)) + n \tag{I}$$

$$Ea = |0.008314 \times m| \tag{II}$$

$a_T$: shift factor
Ea: activation energy of the flow (unit: kJ/mol)
T: temperature (unit: ° C.)

Commercially available calculation softwares may be used for the above-described calculation. The calculation software includes, for example, Rhios V.4.4.4 from Rheometrics, and the like.

The shift factor ($a_T$) is the amount of movement when a double logarithmic curve of the melt complex viscosity-angular frequency is created by plotting with the common logarithm of the melt complex viscosity at each temperature (T) as the X axis and the common logarithm of the angular frequency as the Y axis, and the double logarithmic curves of the melt complex viscosity-angular frequency at 130° C., 150° C. and 170° C. are each moved to the X axis direction, respectively, to be superposed on the double logarithmic curve of the melt complex viscosity-angular frequency at 190° C. In the superposition, the double logarithmic curve of the melt complex viscosity-angular frequency at each temperature (T) is moved to $a_T$ times for angular frequency and to $1/a_T$ times for melt complex viscometer. The correlation coefficient when determining the equation (I) by a least square method from the values at four points of 130° C., 150° C., 170° C. and 190° C. is usually 0.99 or more.

Measurement of the melt complex viscosity-angular frequency curve is conducted using a viscoelasticity measuring apparatus (for example, Rheometrics Mechanical Spectrometer RMS-800 manufactured by Rheometrics, and the like) usually under conditions of geometry: parallel plate, plate diameter: 25 mm, plate spacing: 1.5 to 2 mm, strain: 5%, and angular frequency: 0.1 to 100 rad/second. Note that the measurement is performed in a nitrogen atmosphere, and it is preferable to blend an appropriate amount (for example, 1000 ppm) of antioxidant to the measurement sample in advance.

The ratio of the weight-average molecular weight to the number-average molecular weight (hereinafter, expressed as Mw/Mn) of the component (A) is preferably 6.0 or more, more preferably 6.5 or more, further preferably 7.0 or more, from the standpoint of more improving the slipperiness of the film. The Mw/Mn of the component (A) is preferably 15 or less, more preferably 12 or less, further preferably 10 or less, from the standpoint of reducing extrusion load at the time of formation of the film. The Mw/Mn of the component (A) is preferably 6.0 or more and 15 or less, more preferably 6.5 or more and 12 or less, further preferably 7.0 or more and 10 or less.

The ratio of the z-average molecular weight to the weight-average molecular weight (hereinafter, expressed as Mz/Mw) of the component (A) is preferably 2.0 or more, more preferably 2.1 or more, further preferably 2.2 or more, from the standpoint of more improving the slipperiness of the film. The Mz/Mw of the component (A) is preferably 5 or less, more preferably 4 or less, further preferably 3 or less, from the standpoint of reducing appearance defects such as film fish eye. The Mz/Mw of the component (A) is preferably 2.0 or more and 5 or less, more preferably 2.1 or more and 4 or less, further preferably 2.2 or more and 3 or less.

The tensile impact strength (unit is $kJ/m^2$) of the component (A) is preferably 400 $kJ/m^2$ or more, more preferably 500 $kJ/m^2$ or more, further preferably 600 $kJ/m^2$ or more, from the standpoint of enhancing the mechanical strength of the film. Further, it is preferably 2000 $kJ/m^2$ or less, more preferably 1800 $kJ/m^2$ or less, further preferably 1500 $kJ/m^2$ or less, from the standpoint of enhancing the openability of the packaging container containing the film. The tensile impact strength of the component (A) is preferably 400 $kJ/m^2$ or more and 2000 $kJ/m^2$ or less, more preferably 500 $kJ/m^2$ or more and 1800 $kJ/m^2$ or less, further preferably 600 $kJ/m^2$ or more and 1500 $kJ/m^2$ or less.

The tensile impact strength of the component (A) is measured on a sheet with a thickness of 2 mm compression-molded under conditions of a molding temperature of 190° C., a pre-heat time of 10 minutes, a compression time of 5 minutes and a compression pressure of 5 MPa, according to ASTM D1822-68.

The tensile impact strength of the component (A) can be controlled by adjusting the ratio of ethylene to an α-olefin in polymerization. When the ratio of an α-olefin to ethylene is increased, the tensile impact strength of the component (A) increases, while when the ratio is decreased, the tensile impact strength of the component (A) decreases.

The tensile impact strength of the component (A) can be controlled also by adjusting the number of carbon atoms of an α-olefin to be copolymerized with ethylene. When the number of carbon atoms of an α-olefin is increased, the tensile impact strength of the component (A) increases, while when the number of carbon atoms is decreased, the tensile impact strength of the component (A) decreases.

The limiting viscosity (hereinafter, expressed as [η]; unit is dl/g) of the component (A) is preferably 1.0 dl/g or more, more preferably 1.2 dl/g or more, further preferably 1.3 dl/g or more, from the standpoint of more improving the slipperiness of the film. The [η] of the component (A) is preferably 2.0 dl/g or less, more preferably 1.9 dl/g or less, further preferably 1.7 dl/g or less, from the standpoint of reducing appearance defects such as film fish eye. The [η] of the component (A) is preferably 1.0 dl/g or more and 2.0 dl/g or less, more preferably 1.2 dl/g or more and 1.9 dl/g or less, further preferably 1.3 dl/g or more and 1.7 dl/g or less. The [η] of the component (A) is measured by a Ubbelohde viscometer at a temperature of 135° C. using tetralin as a solvent.

The melt tension (hereinafter, expressed as MT; unit is cN) of the component (A) is preferably 7 or more, more preferably 8 or more, further preferably 9 or more, particularly preferably 10 or more, from the standpoint of enhancing the stability of bubbles at the time of formation of the film by an inflation film formation method. The MT of the component (A) is preferably 30 or less, more preferably 25 or less, further preferably 20 or less, from the standpoint of enhancing the film withdrawability at the time of formation of the film by an inflation film formation method. The MT of the component (A) is preferably 7 or more and 30 or less, more preferably 8 or more and 25 or less, further preferably 9 or more and 20 or less, particularly preferably 10 or more and 20 or less. The MT of the component (A) can be controlled by adjusting the ratio of hydrogen to ethylene in polymerizing ethylene and an α-olefin. In slurry polymerization, the MT of the component (A) can be controlled to 7 or more and 30 or less by adjusting the ratio of hydrogen to ethylene to 0.3 to 1.1 mol %. In gas polymerization, the MT of the component (A) can be controlled to 7 or more and 30 or less by adjusting the ratio of hydrogen to ethylene to 0.1 to 0.8 mol %.

The melt tension is measured under the following conditions.

A molten resin filled in a barrel with a diameter of 9.5 mm is extruded from an orifice having a diameter of 2.09 mm and a length of 8 mm at a temperature of 190° C. using a melt tension tester manufactured by Toyo Seiki Seisaku-sho, Ltd. at a piston lowering speed of 5.5 mm/min (shearing speed 7.4 $sec^{-1}$). The extruded molten resin is wound using a winding roll having a diameter of 50 mm at a winding rise speed of 40 rpm/min, and the tension value immediately before the molten resin breaks is defined as MT.

The characteristic relaxation time (τ; unit is second) of the component (A) is preferably 10 second or more, more preferably 15 second or more, further preferably 25 second or more, particularly preferably 30 second or more, from the standpoint of more improving the slipperiness of the film. Further, the characteristic relaxation time of the component (A) is preferably 60 second or less, more preferably 55 second or less, further preferably 50 second or less, particularly preferably 45 second or less, from the standpoint of reducing extrusion load at the time of formation of the film and from the standpoint of the appearance of the film. The characteristic relaxation time of the component (A) is preferably 10 second or more and 60 second or less, more preferably 15 second or more and 55 second or less, further preferably 25 second or more and 50 second or less, particularly preferably 30 second or more and 45 second or less.

The characteristic relaxation time (τ) is a numerical value related to the length of the long chain branch and the amount of the long chain branch possessed by the ethylene-α-olefin copolymer, and the molecular weight distribution. When the long chain branch is short, the amount of the long chain branch is small, or the amount of high molecular weight components is small, the characteristic relaxation time becomes a small value. When the long chain branch is long, the amount of the long chain branch is large, or the amount of high molecular weight components is large, the characteristic relaxation time becomes a large value. The ethylene-α-olefin copolymer having a long characteristic relaxation time is extruded from a die of an inflation film forming machine, and solidifies across the cooling line before molecular chain entanglement is sufficiently relaxed. The film containing the component (A) having a characteristic relaxation time of 10 seconds or more has irregularities on the film surface derived from entanglement of molecular chains which are insufficiently relaxed, and the film is more excellent in slipperiness.

The characteristic relaxation time is a numerical value calculated from a master curve showing dependence of melt complex viscometer at 190° C. (unit: Pa·sec) on angular frequency (unit: rad/sec) created based on the temperature-time superposition principle. The characteristic relaxation time is determined by a method shown below. The melt complex viscosity-angular frequency curves of an ethylene-α-olefin copolymer at respective temperatures of 130° C., 150° C., 170° C. and 190° C. (T, unit: ° C.) (unit of melt complex viscometer is Pa·sec, unit of angular frequency is rad/sec) are each superposed on the melt complex viscosity-angular frequency curve at 190° C. based on the temperature-time superposition principle to make a master curve, and the characteristic relaxation time is calculated by approximating the resultant master curve by the following formula (5).

$$\eta = \eta 0 / [1 + (\tau \times \omega)n] \quad (5)$$

η: melt complex viscometer (unit: Pa·sec)
ω: angular frequency (unit: rad/sec)
τ: characteristic relaxation time (unit: sec)
η0: constant determined for every ethylene-α-olefin copolymer (unit: Pa·sec)
n: constant determined for every ethylene-α-olefin copolymer Commercially available calculation softwares may be used for the above-described calculation. The calculation software includes, for example, Rhios V.4.4.4 from Rheometrics.

Measurement of the melt complex viscosity-angular frequency curve is conducted in the same manner as for the melt complex viscosity-angular frequency curve measured for calculating the activation energy of flow described above.

The ratio of the melt complex viscometer at a temperature of 170° C. and an angular frequency of 0.1 rad/second (η*0.1; unit is Pa·second) to the melt complex viscometer at a temperature of 170° C. and an angular frequency of 100 rad/second (η*100; unit is Pa·second), η*0.1/η*100, of the component (A) is preferably 50 or more, more preferably 70 or more, further preferably 90 or more, particularly preferably 100 or more, from the standpoint of reducing extrusion load at the time of formation of the film. Further, the η*0.1/η*100 of the component (A) is preferably 200 or less, more preferably 180 or less, further preferably 160 or less, particularly preferably 130 or less, from the standpoint of reducing appearance defects such as film fish eye. The η*0.1/η*100 of the component (A) is preferably 50 or more and 200 or less, more preferably 70 or more and 180 or less, further preferably 90 or more and 160 or less, particularly preferably 100 or more and 130 or less.

Measurement of the melt complex viscosity-angular frequency curve is conducted using a viscoelasticity measuring apparatus (for example, Rheometrics Mechanical Spectrometer RMS-800 manufactured by Rheometrics, and the like) usually under conditions of geometry: parallel plate, plate diameter: 25 mm, plate spacing: 1.5 to 2 mm, strain: 5%, and angular frequency: 0.1 to 100 rad/second. Note that the measurement is performed in a nitrogen atmosphere, and it is preferable to blend an appropriate amount (for example, 1000 ppm) of antioxidant to the measurement sample in advance.

The method for producing the component (A) includes a method of copolymerizing ethylene and an α-olefin in the presence of an olefin polymerization catalyst obtained by bringing a component (H) prepared by supporting an activation co-catalyst component (hereinafter, referred to as component (I)) on a fine particulate carrier, a metallocene-based complex and an electron-donating compound into contact with each other.

As the component (I), zinc compounds are mentioned. The zinc compound includes, for example, compounds obtained by contacting diethyl zinc, fluorinated phenol and water.

The fine particulate carrier is a porous substance having a 50% volume average particle size of 10 to 500 μm. The 50% volume average particle size is measured, for example, by a light scattering laser diffraction method.

The fine particulate carrier includes, for example, inorganic substances and organic polymers. The inorganic substance includes, for example, inorganic oxides such as $SiO_2$, $Al_2O_3$, MgO, $ZrO_2$, $TiO_2$, $B_2O_3$, CaO, ZnO, BaO, $ThO_2$ and the like; clays and clay minerals such as smectite, montmorillonite, hectorite, laponite, saponite and the like. The organic polymer includes, for example, polyethylene, polypropylene and styrene-divinylbenzene copolymer. The fine particulate carrier is preferably a fine particulate carrier composed of an inorganic substance (hereinafter, referred to as inorganic fine particulate carrier).

The pore volume of the fine particulate carrier is usually 0.3 to 10 ml/g. The specific surface area of the fine particulate carrier is usually 10 to 1000 $m^2$/g. The pore volume and the specific surface area are measured by a gas adsorption method, and the pore volume is determined by analyzing the gas desorption amount of a BJH method and the specific surface area is determined by analyzing the gas adsorption amount by a BET method.

[Component (H)]

The component (H) is a carrier obtained by supporting the component (I) on a fine particulate carrier.

The component (H) can be obtained by bringing diethyl zinc (hereinafter, referred to as component (a)), fluorinated phenol (hereinafter, referred to as component (b)), water (hereinafter, referred to as component (c)), an inorganic fine particulate carrier (hereinafter, referred to as component (d)) and trimethyldisilazane $(((CH_3)_3Si)_2NH)$ (hereinafter, referred to as component (e)) into contact with each other.

The component (b) includes, for example, 3,4,5-trifluorophenol, 3,4,5-tris(trifluoromethyl)phenol, 3,4,5-tris(pentafluorophenyl)phenol, 3,5-difluoro-4-pentafluorophenylphenol or 4,5,6,7,8-pentafluoro-2-naphthol, and is preferably 3,4,5-trifluorophenol.

The component (d) is preferably silica gel.

In the method for producing the component (I), the component (a), the component (b) and the component (c) can be used so that if the molar ratio of component (a):component (b):component (c) is 1:y:z, y and z satisfy the following formulae.

$$|2-y-2z| \leq 1 \quad (2)$$

$$z \geq -2.5y+2.48 \quad (3)$$

$$y<1 \quad (4)$$

(in the above-described formulae (2) to (4), y and z represent numbers larger than 0.)

The molar ratio y of the use amount of the component (b) to the use amount of the component (a) and the molar ratio z of the use amount of the component (c) to the use amount of the component (a) are not particularly restricted as long as the above-described formulae (2), (3) and (4) are satisfied. y is usually 0.55 to 0.99, preferably 0.55 to 0.95, more preferably 0.6 to 0.9, further preferably 0.7 to 0.8. To obtain an ethylene-α-olefin copolymer in which η*0.1/f*100 is 50 or more, it is preferable that y is 0.55 or more. When y is 1 or more, a film containing the resulting ethylene-α-olefin copolymer causes appearance defects such as fish eye.

The use amount of the component (a) and the use amount of the component (d) are adjusted so that the number of moles of a zinc atom derived from the component (a) contained in 1 g of particles obtained by contact of the component (a) and the component (d) is preferably 0.1 mmol or more, more preferably 0.5 to 20 mmol. The use amount of the component (e) to the component (d) is preferably 0.1 mmol or more, more preferably 0.5 to 20 mmol with respect to 1 g of the component (d).

The metallocene-based complex is a transition metal compound comprising a ligand containing a cyclopentadiene-type anion skeleton.

The metallocene-based complex is preferably a transition metal compound represented by the following general formula [1] or its μ-oxo type transition metal compound dimer.

  [1]

(wherein, $M^2$ is a periodic table Group 3 to 11 or lanthanoid series transition metal atom. $L^2$ is a group having a cyclopentadiene-type anion skeleton, and a plurality of $L^2$ may be directly connected to each other or may be connected via a residue containing a carbon atom, a silicon atom, a nitrogen atom, an oxygen atom, a sulfur atom or a phosphorus atom. $X^1$ is a halogen atom, a hydrocarbon group (excluding a group having a cyclopentadiene-type anion skeleton) or a hydrocarbonoxy group. a represents 2 and b represents 2.)

In the general formula [1], $M^2$ is a Group 3 to 11 or lanthanoid series transition metal atom of the periodic table (IUPAC 1989), and includes, for example, a scandium atom, a yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom and a ytterbium atom. In the general formula [1], $M^2$ is preferably a titanium atom, a zirconium atom, a hafnium atom, a vanadium atom, a chromium atom, an iron atom, a cobalt atom or a nickel atom, more preferably a titanium atom, a zirconium atom or a hafnium atom, further preferably a zirconium atom.

In the general formula [1], $L^2$ represents an $\eta^5$-(substituted)indenyl group, and two groups $L^2$ may be the same or different. Two groups $L^2$ are combined together via a crosslinking group containing a carbon atom, a silicon atom, a nitrogen atom, an oxygen atom, a sulfur atom or a phosphorus atom.

The $\eta^5$-(substituted)indenyl group represents an $\eta^5$-indenyl group optionally having a substituent.

The $\eta^5$-(substituted)indenyl group represented by $L^2$ is an $\eta^5$-(substituted)indenyl group in which a hydrogen atom is present at least at the position 5 and the position 6, and includes specifically an $\eta^5$-indenyl group, an $\eta^5$-2-methylindenyl group, an $\eta^5$-3-methylindenyl group, an $\eta^5$-4-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4-phenylindenyl group, an $\eta^5$-2-methyl-4-phenylindenyl group, an $\eta^5$-2-methyl-4-naphthylindenyl group and substitutes thereof.

In the present specification, "$\eta^5$-" may be abbreviated in the name of a transition metal compound. $L^2$ is preferably an indenyl group.

Two (substituted)indenyl groups are combined together via a crosslinking group containing a carbon atom, a silicon atom, a nitrogen atom, an oxygen atom, a sulfur atom or a phosphorus atom. The crosslinking group includes, for example, alkylene groups such as an ethylene group, a propylene group and the like; substituted alkylene groups such as a dimethylmethylene group, a diphenylmethylene group and the like; or substituted silylene groups such as a silylene group, a dimethylsilylene group, a diphenylsilylene group, a tetramethyldisilylene group and the like; and hetero atoms such as a nitrogen atom, an oxygen atom, a sulfur atom, a phosphorus atom and the like. The crosslinking group is preferably an ethylene group, a dimethylmethylene group or a dimethylsilylene group, more preferably an ethylene group.

In the general formula [1], $X^1$ is a halogen atom, a hydrocarbon group (excluding a group having a cyclopentadiene-type anion skeleton) or a hydrocarbonoxy group. The halogen atom includes, for example, a fluorine atom, a chlorine atom, a bromine atom and an iodine atom. The hydrocarbon group referred to here includes, for example, an alkyl group, an aralkyl group, an aryl group and an alkenyl group. The hydrocarbonoxy group includes, for example, an alkoxy group, an aralkyloxy group and an aryloxy group.

The alkyl group includes, for example, a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group and a n-eicosyl group. The alkyl group may be substituted with a halogen atom such as a fluorine atom, a chlorine atom, a bromine atom and an iodine atom. The alkyl group substituted with a halogen atom includes, for example, a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group and a perbromopropyl group. A part of hydrogen atoms in any of these alkyl groups may be substituted with an alkoxy group such as a methoxy group, an ethoxy group or the like; an aryloxy group such as a phenoxy group or the like; or an aralkyloxy group such as a benzyloxy group or the like.

The aralkyl group includes, for example, a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, a (ethylphenyl)methyl group, a (n-propylphenyl)methyl group, a (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a naphthylmethyl group and an anthracenylmethyl group. The aralkyl group optionally has, for example, a halogen atom such as a fluorine atom, a chlorine atom, a bromine atom, an iodine atom and the like; an alkoxy group such as a methoxy group, an ethoxy group and the like; an aryloxy group such as a phenoxy group and the like; or an aralkyloxy group such as a benzyloxy group and the like, as a substituent.

The aryl group includes, for example, a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a -trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. The aryl group optionally has, for example, a halogen atom such as a fluorine atom, a chlorine atom, a bromine atom, an iodine atom and the like; an alkoxy group such as a methoxy group, an ethoxy group and the like; an aryloxy group such as a phenoxy group and the like, or an aralkyloxy group such as a benzyloxy group and the like, as a substituent.

The alkenyl group includes, for example, an aryl group, a methacryl group, a crotyl group and a 1,3-diphenyl-2-propenyl group.

The alkoxy group includes, for example, a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-icosoxy group. The alkoxy group optionally has, for example, a halogen atom such as a fluorine atom, a chlorine atom, a bromine atom, an iodine atom and the like; an alkoxy group such as a methoxy group, an ethoxy group and the like; an aryloxy group such as a phenoxy group and the like, or an aralkyloxy group such as a benzyloxy group and the like, as a substituent.

The aralkyloxy group includes, for example, a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, a (ethylphenyl)methoxy group, a (n-propylphenyl)methoxy group, a (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group and an anthracenylmethoxy group. The aralkyloxy group optionally has, for example, a halogen atom such as a fluorine atom, a chlorine atom, a bromine atom, an iodine atom and the like; an alkoxy group such as a methoxy group, an ethoxy group and the like; an aryloxy group such as a phenoxy group and the like, or an aralkyloxy group such as a benzyloxy group and the like, as a substituent.

The aryloxy group includes, for example, a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group. The aryloxy group optionally has, for example, a halogen atom such as a fluorine atom, a chlorine atom, a bromine atom, an iodine atom and the like; an alkoxy group such as a methoxy group, an ethoxy group and the like; an aryloxy group such as a phenoxy group and the like, or an aralkyloxy group such as a benzyloxy group and the like, as a substituent. $X^1$ is preferably a chlorine atom, a methoxy group or a phenoxy group, more preferably a chlorine atom or a phenoxy group, further preferably a phenoxy group.

In the general formula [1], a represents 2 and b represents 2.

Specific examples of the metallocene-based complex include dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride and dimethylsilylenebis (2-methyl-4-naphthylindenyl)titanium dichloride, and, compounds obtained by substituting titanium in these compounds with zirconium or hafnium compounds obtained by substituting dimethylsilylene in these compounds with methylene, ethylene, dimethylmethylene(isopropylidene), diphenylmethylene, diethylsilylene, diphenylsilylene or dimethoxysilylene, and compounds obtained by substituting dichloride in these compounds with difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide).

The metallocene-based complex is preferably ethylenebis (indenyl)zirconium dichloride, dimethylsilylenebis(indenyl) zirconium dichloride, dimethylmethylenebis(indenyl)zirconium dichloride, ethylenebis(indenyl)zirconium diphenoxide, dimethylsilylenebis(indenyl)zirconium diphenoxide or dimethylmethylenebis(indenyl)zirconium diphenoxide, more preferably ethylenebis(indenyl)zirconium diphenoxide.

The olefin polymerization catalyst obtained by contacting the component (H) and the metallocene-based complex is preferably an olefin polymerization catalyst obtained by contacting the component (H), the metallocene-based complex and an organic aluminum compound.

The organic aluminum compound includes, for example, trimethylaluminum, triethylaluminum, tributylaluminum, triisobutylaluminum and tri-n-octylaluminum, and is preferably triisobutylaluminum or tri-n-octylaluminum, more preferably triisobutylaluminum.

The electron-donating compound includes, for example, triethylamine, triisobutylamine and tri-n-octylamine, and is preferably triethylamine.

The use amount of the metallocene-based complex is preferably $5 \times 10^{-6}$ to $5 \times 10^{-4}$ mol with respect to 1 g of the component (H). The use amount of the organic aluminum compound is preferably 1 to 2000 in terms of the ratio of the number of moles of an aluminum atom of the organic aluminum compound to the number of moles of a metal atom of the metallocene-based complex (Al/M).

The polymerization catalyst obtained by contacting the component (H), the metallocene-based complex, the organic aluminum compound and the electron-donating compound may, if necessary, be a polymerization catalyst obtained by contacting oxygen.

The use amount of the electron-donating compound is preferably 1 to 50 mol %, more preferably 3 to 20 mol % with respect to the number of moles of an aluminum atom of the organic aluminum compound.

The use amount of oxygen is preferably 1 to 100 mol %, more preferably 5 to 80 mol %, further preferably 10 to 40 mol % with respect to the number of moles of an aluminum atom of the organic aluminum compound.

The olefin polymerization catalyst is preferably a prepolymerization catalyst component obtained by polymerizing (hereinafter, referred to as pre-polymerization) a small amount of olefin in the presence of a catalyst component obtained by contacting the component (H), the metallocene-based complex and the organic aluminum compound.

The method for producing the above-described prepolymerization catalyst component includes a production method of the prepolymerization catalyst component including the following steps (1), (2), (3) and (4).

Step (1): a step of thermally treating a saturated aliphatic hydrocarbon compound solution containing a metallocene-based complex at a temperature of 40° C. or more to obtained a heat-treated substance.

Step (2): a step of contacting the heat-treated substance obtained in the step (1) and the component (H) to obtain a contact-treated substance.

Step (3): a step of contacting the contact-treated substance obtained in the step (2) and an organic aluminum compound to obtain a catalyst component.

Step (4): a step of pre-polymerizing an olefin in the presence of the catalyst component obtained in the step (3) to obtain a prepolymerization catalyst component.

The saturated aliphatic hydrocarbon compound solution containing a metallocene-based complex in the step (1) is prepared, for example, by a method of adding a metallocene-based complex into a saturated aliphatic hydrocarbon compound solvent. The metallocene-based complex is usually added in the form of a powder or a slurry of a saturated aliphatic hydrocarbon compound liquid.

The saturated aliphatic hydrocarbon compound which is used for preparation of a saturated aliphatic hydrocarbon compound solution containing a metallocene-based complex includes, for example, propane, normal-butane, isobutane, normal-pentane, isopentane, normal-hexane, cyclohexane and heptane. The saturated aliphatic hydrocarbon compound solution may contain only one or two or more of these saturated aliphatic hydrocarbon compounds. The saturated aliphatic hydrocarbon compound preferably has a boiling point at normal pressure of 100° C. or less, more preferably has a boiling point at normal pressure of 90° C. or less, and further preferably is propane, normal butane, isobutane, normal pentane, isopentane, normal hexane or cyclohexane.

For the thermal treatment of the saturated aliphatic hydrocarbon compound solution containing a metallocene-based complex, the temperature of a saturated aliphatic hydrocarbon compound solvent containing a metallocene-based complex may be adjusted to a temperature of 40° C. or more. During the thermal treatment, the solvent may be allowed to stand still or the solvent may be stirred. The temperature is preferably 45° C. or more, more preferably 50° C. or more, from the standpoint of enhancing the molding processability of the film. Further, it is preferably 100° C. or less, more preferably 80° C. or less, from the standpoint of enhancing catalytic activity. The time of the thermal treatment is usually 0.5 to 12 hours. The time is preferably 1 hour or more, more preferably 2 hours or more, from the standpoint of enhancing the molding processability of the film. It is preferably 6 hours or less, more preferably 4 hours or less, from the standpoint of stability of catalytic performance.

In the step (2), the heat-treated substance and the component (H) may be brought into contact. The contacting method includes, for example, a method of adding the component (H) to the heat-treated substance, or a method of adding the heat-treated substance the component (H) into a saturated aliphatic hydrocarbon compound. The component (H) is added usually in the form of a powder or a slurry of a saturated aliphatic hydrocarbon compound solvent.

The temperature of the contacting treatment in the step (2) is preferably 70° C. or less, more preferably 60° C. or less, and preferably 10° C. or more, more preferably 20° C. or more. The time of the contacting treatment is usually 0.1 hours to 2 hours.

In the step (3), the contact-treated substance obtained in the step (2) and an organic aluminum compound may be brought into contact. As the contacting method, for example, a method of adding an organic aluminum compound to the contact-treated substance obtained in the step (2) or a method of adding the contact-treated substance obtained in the step (2) and an organic aluminum compound into a saturated aliphatic hydrocarbon compound is used.

The temperature of the contacting treatment in the step (3) is preferably 70° C. or less, more preferably 60° C. or less. Further, it is preferably 10° C. or more, more preferably 20° C. or more, from the standpoint of efficiently expressing the activity of prepolymerization. The time of the contacting treatment is usually 0.01 hours to 0.5 hours.

The contacting treatment in the step (3) is preferably conducted in the presence of an olefin. The olefin usually includes an olefin which is used as a raw material in pre-polymerization. The olefin amount is preferably 0.05 to 1 g per 1 g of the component (H).

Regarding the above-described steps (1) to (3), all the steps (1) to (3) may be conducted in a pre-polymerization reactor, the steps (2) and (3) may be conducted in a pre-polymerization reactor, or the step (3) may be conducted in a pre-polymerization reactor, by separately adding a saturated aliphatic hydrocarbon compound, then component (H), a metallocene-based complex and an organic aluminum compound into the pre-polymerization reactor.

The step (4) is a step of pre-polymerizing an olefin (small amount of olefin is polymerized) in the presence of the catalyst component obtained in the step (3) to obtain a prepolymerization catalyst component. The pre-polymerization is usually conducted by a slurry polymerization method, and the pre-polymerization may adopt any of batch mode, semi-batch mode or continuous mode. Further, the prepolymerization may be performed by adding a chain transfer agent such as hydrogen.

When prepolymerization is performed by a slurry polymerization method, a saturated aliphatic hydrocarbon compound is usually used as a solvent. The saturated aliphatic hydrocarbon compound includes, for example, propane, normal butane, isobutane, normal pentane, isopentane, normal hexane, cyclohexane and heptane. These are used singly or in combination of two or more of them. The saturated aliphatic hydrocarbon compound preferably has a boiling point at normal pressure of 100° C. or less, more preferably has a boiling point at normal pressure of 90° C. or less, and further preferably is propane, normal butane, isobutane, normal pentane, isopentane, normal hexane or cyclohexane.

When the prepolymerization is performed by a slurry polymerization method, the slurry concentration is usually 0.1 to 600 g, preferably 0.5 to 300 g in terms of the amount of the component (H) per 1 liter of a solvent. The prepolymerization temperature is usually −20 to 100° C., preferably 0 to 80° C. During the prepolymerization, the polymerization temperature may be appropriately changed, but the temperature at which prepolymerization is initiated is preferably 45° C. or less, more preferably 40° C. or less. Further, the partial pressure of olefins in a gas phase portion during prepolymerization is usually 0.001 to 2 MPa, more preferably 0.01 to 1 MPa. The prepolymerization time is usually 2 minutes to 15 hours.

The olefin used for prepolymerization includes, for example, ethylene, propylene, 1-butene, 1-pentene, 1-hexene, 1-octene, 4-methyl-1-pentene, cyclopentene and cyclohexene. These can be used singly or in combination of two or more of them, and it is preferable that only ethylene is used or ethylene and an α-olefin are used together, it is more preferable that only ethylene is used or at least one α-olefin selected from 1-butene, 1-hexene and 1-octene, and ethylene are used together.

The content of a polymer pre-polymerized in a prepolymerization catalyst component is usually 0.01 to 1000 g, preferably 0.05 to 500 g, more preferably 0.1 to 200 g per 1 g of the component (H).

As the production method of the component (A), slurry polymerization or a gas phase polymerization method is preferable, and a continuous gas phase polymerization method is more preferable. Examples of the solvent used in the slurry polymerization method include inert hydrocarbon solvents such as propane, butane, isobutane, pentane, hexane, heptane, octane and the like. The gas phase polymerization reaction apparatus used for the continuous gas phase polymerization method is usually an apparatus having a fluidized bed type reaction vessel, and preferably an apparatus having a fluidized bed type reaction vessel having an enlarged portion. A stirring blade may be installed in the reaction vessel.

When the olefin polymerization catalyst is an olefin polymerization catalyst containing a prepolymerization catalyst component, as a method of supplying the prepolymerization catalyst component to a continuous polymerization reaction vessel for forming particles of the component (A), usually a method of supplying in the absence of water using an inert gas such as argon or the like, nitrogen, hydrogen or ethylene, or a method of dissolving or diluting each component in a solvent and supplying in a solution or slurry state is used.

The polymerization temperature of gas phase polymerization of the component (A) is usually less than the temperature at which the component (A) melts, preferably 0 to 150° C., more preferably 30 to 100° C., further preferably 70° C. to 87° C. Hydrogen may be added to adjust the melt flowability of the component (A). Hydrogen is preferably controlled to be 0.01 to 1.1 mol % with respect to 100 mol % of ethylene. The ratio of hydrogen to ethylene in gas phase polymerization can be controlled by the amount of hydrogen evolved during the polymerization and the amount of hydrogen added during the polymerization. An inert gas may be coexistent in a mixed gas of a polymerization reaction tank. When the olefin polymerization catalyst is an olefin polymerization catalyst containing a prepolymerization catalyst component, the olefin polymerization catalyst may contain a cocatalyst component such as an organic aluminum compound and the like.

By adding the component (A) to the component (B) or the component (C) to produce a film, a film with improved slipperiness can be obtained. The component (A) can be used as a slipperiness modifier.

In order to improve the slipperiness of the film, the component (A) is preferably contained in an amount of 1% by weight or more and 30% by weight or less with respect to 100% by weight of the resin component of the film.

<Ethylene-Based Resin Composition>

The film is preferably a film containing an ethylene-based resin composition containing the component (A) and the component (B) in which the content of the component (A) of 1% by weight or more and 30% by weight or less with respect to 100% by weight of the total amount of the component (A) and the component (B), from the standpoint of slipperiness of the film.

In the ethylene-based resin composition, the total amount of the component (A) and the component (B) is preferably 50% by weight or more with respect to 100% by weight of the total weight of the ethylene-based resin composition.

In the ethylene-based resin composition, the content of the component (A) is 1% by weight or more and 30% by weight or less, preferably 2% by weight or more and 20% by weight or less, more preferably 3% by weight or more and 15% by weight or less with respect to 100% by weight of the total amount of the component (A) and the component (B).

<Component (B)>

The α-olefin having 3 to 20 carbon atoms forming a monomer unit based on an α-olefin having 3 to 20 carbon atoms in the component (B) includes propylene, 1-butene, 1-pentene, 1-hexene, 1-heptene, 1-octene, 1-nonene, 1-decene, 1-dodecene, 4-methyl-1-pentene and 4-methyl-1-hexene. The component (B) may contain only one or two or more of these monomer units based on an α-olefin having 3 to 20 carbon atoms. The α-olefin having 3 to 20 carbon atoms is preferably 1-hexene, 4-methyl-1-pentene or 1-octene, more preferably 1-hexene or 1-octene.

The content of a monomer unit based on ethylene in the component (B) is preferably 50 to 99.5% by weight with respect to 100% by weight of the total weight of the component (B). The content of a monomer unit based on an α-olefin is preferably 0.5 to 50% by weight with respect to 100% by weight of the total weight of the component (B).

The component (B) may have a monomer unit based on a monomer other than ethylene and an α-olefin having 3 to 20 carbon atoms. The monomer other than ethylene and an α-olefin having 3 to 20 carbon atoms includes, for example, conjugated dienes such as butadiene, isoprene or the like; non-conjugated dienes such as 1,4-pentadiene or the like; acrylic acid; acrylic acid esters such as methyl acrylate, ethyl acrylate or the like; methacrylic acid; methacrylic acid esters such as methyl methacrylate, ethyl methacrylate or the like; and vinyl acetate.

The component (B) is preferably a copolymer comprising a monomer unit based on ethylene and a monomer unit based on an α-olefin having 4 to 20 carbon atoms, more preferably a copolymer comprising a monomer unit based on ethylene and a monomer unit based on an α-olefin having 5 to 20 carbon atoms, further preferably a copolymer comprising a monomer unit based on ethylene and a monomer unit based on an α-olefin having 6 to 20 carbon atoms.

The component (B) includes, for example, an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer and an ethylene-1-butene-1-octene copolymer. The component (B) is preferably an ethylene-1-hexene copolymer, an ethylene-4-methyl-1-pentene copolymer or an ethylene-1-octene copolymer, more preferably an ethylene-1-hexene copolymer.

The density of the component (B) is 890 kg/m$^3$ or more and 930 kg/m$^3$ or less. It is preferably 895 kg/m$^3$ or more, more preferably 900 kg/m$^3$ or more, further preferably 905 kg/m$^3$ or more, particularly preferably 910 kg/m$^3$ or more, from the standpoint of more improving the slipperiness of the film. Further, the density of the component (B) is preferably 925 kg/m$^3$ or less, more preferably 920 kg/m$^3$ or less, further preferably 915 kg/m$^3$ or less, from the standpoint of the strength of the film. The density of the component (B) is preferably 895 kg/m$^3$ or more and 925 kg/m$^3$ or less, more preferably 900 kg/m$^3$ or more and 920 kg/m$^3$ or less, further preferably 905 kg/m$^3$ or more and 915 kg/m$^3$ or less, particularly preferably 910 kg/m$^3$ or more and 915 kg/m$^3$ or less.

The MFR of the component (B) is 0.5 g/10 min or more and 5 g/10 min or less. The MFR of the component (B) is preferably 0.8 g/10 min or more, more preferably 1.0 g/10 min or more, from the standpoint of the molding processability of the film, particularly from the standpoint of reducing extrusion load at the time of formation of the film. The MFR of the component (B) is preferably 4.0 g/10 min or less, more preferably 3.0 g/10 min or less, further preferably 2.5 g/10 min or less, from the standpoint of the strength of the film. The MFR of the component (B) is preferably 0.8 g/10 min or more and 4.0 g/10 min or less, more preferably 1.0 g/10 min or more and 3 g/10 min or less, further preferably 1 g/10 min or more and 2.5 g/10 min or less. In measurement of MFR, a sample obtained by blending about 1000 ppm of an antioxidant with the component (B) is usually used.

The MFRR of the component (B) is 10 or more and 30 or less. The MFRR of the component (B) is preferably 15 or more, more preferably 17 or more, further preferably 20 or more, from the standpoint of the molding processability of the film, particularly from the standpoint of reducing extrusion load at the time of formation of the film. The MFRR of the component (B) is preferably 28 or less, more preferably 26 or less, from the standpoint of the strength of the film. The MFRR of the component (B) is preferably 15 or more and 28 or less, more preferably 17 or more and 26 or less, further preferably 20 or more and 26 or less.

In measurement of the MFRR of the component (B), a sample obtained by blending 1000 ppm of an antioxidant with the component (B) is generally used.

The ratio of the weight-average molecular weight to the number-average molecular weight (Mw/Mn) of the component (B) is preferably 2 or more, more preferably 2.1 or more, further preferably 2.2 or more, particularly preferably 2.3 or more, from the standpoint of the stability of bubbles at the time of formation of the film by an inflation film formation method. The Mw/Mn of the component (B) is preferably 7 or less, more preferably 6 or less, further preferably 5 or less, particularly preferably 4 or less, from the standpoint of the strength of the film. The Mw/Mn of the component (B) is preferably 2 or more and 7 or less, more preferably 2.1 or more and 6 or less, further preferably 2.2 or more and 5 or less, particularly preferably 2.3 or more and 4 or less. The Mw/Mn of the component (B) is measured by the same method as for the Mw/Mn of the component (A).

The Ea of the component (B) is preferably 15 kJ/mol or more, more preferably 20 kJ/mol or more, further preferably 25 kJ/mol or more, from the standpoint of the stability of bubbles at the time of formation of the film by an inflation film formation method. The Ea of the component (B) is preferably 50 kJ/mol or less, more preferably 45 kJ/mol or less, further preferably 40 kJ/mol or less, from the standpoint of the strength of the film. The Ea of the component (B) is preferably 15 kJ/mol or more and 50 kJ/mol or less, more preferably 20 kJ/mol or more and 45 kJ/mol or less, further preferably 25 kJ/mol or more and 40 kJ/mol or less. The Ea is measured by the same method as for the Ea of the component (A).

The component (B) can be produced by copolymerizing ethylene and an α-olefin in the presence of a metallocene-based polymerization catalyst or a Ziegler-Natta polymerization catalyst.

Examples of the metallocene-based polymerization catalyst include the following catalysts (1) to (4) and the like.

(1) A catalyst comprising a component containing a transition metal compound having a group having a cyclopentadiene-type skeleton and a component containing an alumoxane compound (2) A catalyst comprising a component containing the above-described transition metal compound and an ionic compound such as trityl borate, anilinium borate or the like (3) A catalyst comprising a component containing the above-described transition metal compound, a component containing the above-described ionic compound, and an organic aluminum compound (4) A catalyst obtained by supporting or impregnating each component according to any one of (1) to (3) on an inorganic particulate carrier such as $SiO_2$, $Al_2O_3$ or the like or a particulate polymer carrier such as an olefin polymer of ethylene, styrene or the like As the Ziegler-Natta type polymerization catalyst, a so-called Mg—Ti-type Ziegler catalyst which is a combination of a solid catalyst component in which a titanium compound is supported on a magnesium compound with organic aluminum (see, e.g., "Catalyst utilization dictionary; published by Kogyo Chosakai Publishing Co., Ltd. in 2004", "Application system diagram-transition of olefin polymerization catalyst-; published by Japan Inst. Of Invention and Innovation in 1995" and the like) is preferable.

The catalyst used for production of the component (B) is preferably a metallocene-based polymerization catalyst, from the standpoint of the strength of the film.

Examples of the polymerization method of the component (B) include bulk polymerization, solution polymerization, slurry polymerization, gas phase polymerization or high pressure ion polymerization method. Bulk polymerization refers to a method of polymerization using a liquid olefin as a medium at a polymerization temperature, and solution polymerization or slurry polymerization refers to a method of polymerization in an inert hydrocarbon solvent such as propane, butane, isobutane, pentane, hexane, heptane, octane and the like. Further, gas phase polymerization refers to a method of polymerizing monomers in gas state in a monomer in gas state as a medium. These polymerization methods may be either batch type or continuous type, and may be either single-stage type performed in a single polymerization tank and multistage type performed in a polymerization apparatus in which a plurality of polymerization reaction tanks are connected in series. The various conditions (polymerization temperature, polymerization pressure, monomer concentration, amount of added catalyst, polymerization time, etc.) in the polymerization step may be appropriately determined.

The ethylene-based resin composition preferably further contains the component (C). The content of the component (C) in the ethylene-based resin composition is preferably 1% by weight or more and to 50% by weight or less, more preferably 5% by weight or more and 40% by weight or less, further preferably 10% by weight or more and 30% by weight or less with respect to 100% by weight of the total amount of the component (A), the component (B) and the component (C).

<Component (C)>

The component (C) is at least one ethylene-based polymer selected from the group consisting of a high pressure low density polyethylene in which the density is 890 kg/m³ or more and 930 kg/m³ or less, MFR is 0.5 g/10 min or more and 5 g/10 min or less and MFRR is 31 or more and 150 or less (hereinafter, described as component (D) in some cases) and an ethylene-α-olefin copolymer comprising a monomer unit based on ethylene and a monomer unit based on an α-olefin having 3 to 20 carbon atoms in which the density is 890 kg/m³ or more and 930 kg/m³ or less, MFR is 0.5 g/10 min or more and 5 g/10 min or less and MFRR is 31 or more and 150 or less (hereinafter, described as component (E) in some cases).

<Component (D)>

The component (D) is a low density polyethylene produced by a high pressure radical polymerization method.

As a general production method of a high pressure low density polyethylene, a method is mentioned in which ethylene is polymerized in a tank reactor or a tubular reactor in the presence of a radical generator, at a polymerization pressure of 140 to 300 MPa, and at a polymerization temperature of 200 to 300° C. (Koji Saeki, "Polymer Production Process", Kogyo Chosakai Publishing CO., Ltd. (1971), etc.).

The density of the component (D) is 890 kg/m³ or more and 940 kg/m³ or less. The density of the component (D) is preferably 895 kg/m³ or more, more preferably 900 kg/m³ or more, further preferably 905 kg/m³ or more, particularly preferably 910 kg/m³ or more, from the standpoint of more improving the slipperiness of the film. It is preferably 935 kg/m³ or less, more preferably 930 kg/m³ or less, further preferably 925 kg/m³ or less, from the standpoint of the transparency of the film. The density of the component (D) is preferably 895 kg/m$^{-3}$ or more and 935 kg/m³ or less, more preferably 900 kg/m³ or more and 930 kg/m³ or less, further preferably 905 kg/m³ or more and 925 kg/m³ or less, particularly preferably 910 kg/m³ or more and 925 kg/m³ or less.

The MFR of the component (D) is 0.5 g/10 min or more and 5 g/10 min or less. The MFR of the component (D) is preferably 0.8 g/10 min or more, more preferably 0.9 g/10 min or more, from the standpoint of the molding processability of the film, particularly from the standpoint of reducing extrusion load at the time of formation of the film. The MFR of the component (D) is preferably 4.0 g/10 min or less, more preferably 3.0 g/10 min or less, further preferably 2.5 g/10 min or less, from the standpoint of the strength of the film. The MFR of the component (D) is preferably 0.8 g/10 min or more and 4.0 g/10 min or less, more preferably 0.9 g/10 min or more and 3.0 g/10 min or less, further preferably 0.9 g/10 min or more and 2.5 g/10 min or less.

In measurement of the MFR of the component (D), a sample obtained by blending about 1000 ppm of an antioxidant with the component (D) is generally used. The MFR of the component (D) can be controlled by adjusting the amount of hydrogen which is a molecular weight regulator used during polymerization, and hydrocarbons such as methane, ethane and the like.

The MFRR of the component (D) is 31 or more and 150 or less. The MFRR of the component (D) is preferably 35 or more, more preferably 40 or more, further preferably 45 or more, from the standpoint of reducing extrusion load at the time of molding of the film.

The MFRR of the component (D) is preferably 120 or less, more preferably 100 or less, from the standpoint of the strength of the film.

For measurement of the MFRR of the component (D), a sample obtained by blending 1000 ppm of an antioxidant with the component (D) is usually used.

The ratio of the weight-average molecular weight to the number-average molecular weight (Mw/Mn) of the component (D) is preferably 3 or more, more preferably 3.5 or more, further preferably 4 or more, from the standpoint of more improving the slipperiness of the film. The Mw/Mn of the component (D) is preferably 10 or less, more preferably 9 or less, further preferably 8 or less, particularly preferably 7 or less, from the standpoint of the strength of the film. The Mw/Mn of the component (D) is preferably 3 or more and 10 or less, more preferably 3.5 or more and 9 or less, further preferably 4 or more and 8 or less, particularly preferably 4 or more and 7 or less. The molecular weight distribution (Mw/Mn) of the component (D) is measured by the same method as for the Mw/Mn of the component (A).

The Ea of the component (D) is preferably 30 kJ/mol or more, more preferably 40 kJ/mol or more, further preferably 50 kJ/mol or more, from the standpoint of the stability of bubbles at the time of formation of the film by an inflation film formation method. The Ea of the component (D) is preferably 80 kJ/mol or less, more preferably 75 kJ/mol or less, further preferably 70 kJ/mol or less, from the standpoint of the strength of the film. The Ea of the component (D) is preferably 30 kJ/mol or more and 80 kJ/mol or less, more preferably 40 kJ/mol or more and 75 kJ/mol or less, further preferably 50 kJ/mol or more and 70 kJ/mol or less. The Ea of the component (D) is measured by the same method as for the Ea of the component (A).

<Component (E)>

The component (E) is an ethylene-α-olefin copolymer comprising a monomer unit based on ethylene and a monomer unit based on an α-olefin having 3 to 20 carbon atoms in which the density is 890 kg/m$^3$ or more and 930 kg/m$^3$ or less, MFR is 0.5 g/10 min or more and 5 g/10 min or less and MFRR is 31 or more and 150 or less.

The α-olefin having 3 to 20 carbon atoms forming a monomer unit based on an α-olefin having 3 to 20 carbon atoms in the component (E) includes propylene, 1-butene, 1-pentene, 1-hexene, 1-heptene, 1-octene, 1-nonene, 1-decene, 1-dodecene, 4-methyl-1-pentene and 4-methyl-1-hexene. The component (E) may contain only one or two or more of these monomer units based on an α-olefin having 3 to 20 carbon atoms. The α-olefin having 3 to 20 carbon atoms is preferably 1-butene, 1-hexene, 4-methyl-1-pentene or 1-octene, more preferably 1-butene or 1-hexene.

The content of a monomer unit based on ethylene in the component (E) is preferably 50 to 99.5% by weight with respect to 100% by weight of the total weight of the component (E). The content of a monomer unit based on an α-olefin is preferably 0.5 to 50% by weight with respect to 100% by weight of the total weight of the component (E).

The component (E) may have a monomer unit based on a monomer other than ethylene and an α-olefin having 3 to 20 carbon atoms. The monomer other than ethylene and an α-olefin having 3 to 20 carbon atoms includes, for example, conjugated dienes such as butadiene, isoprene or the like; non-conjugated dienes such as 1,4-pentadiene or the like; acrylic acid; acrylic acid esters such as methyl acrylate, ethyl acrylate or the like; methacrylic acid; methacrylic acid esters such as methyl methacrylate, ethyl methacrylate or the like; and vinyl acetate.

The component (E) is preferably a copolymer comprising a monomer unit based on ethylene and a monomer unit based on an α-olefin having 4 to 20 carbon atoms, more preferably a copolymer comprising a monomer unit based on ethylene and a monomer unit based on an α-olefin having 5 to 20 carbon atoms, further preferably a copolymer comprising a monomer unit based on ethylene and a monomer unit based on an α-olefin having 6 to 20 carbon atoms.

The component (E) includes, for example, an ethylene-1-butene copolymer, an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer and an ethylene-1-butene-1-octene copolymer. The component (E) is preferably an ethylene-1-butene copolymer, an ethylene-1-hexene copolymer or an ethylene-1-butene-1-hexene copolymer.

The density of the component (E) is 890 kg/m$^3$ or more and 940 kg/m$^3$ or less. The density of the component (E) is preferably 895 kg/m$^3$ or more, more preferably 900 kg/m$^3$ or more, further preferably 905 kg/m$^3$ or more, particularly preferably 910 kg/m or more, from the standpoint of more improving the slipperiness of the film. The density of the component (E) is preferably 935 kg/m$^3$ or less, more preferably 930 kg/m$^3$ or less, further preferably 925 kg/m$^3$ or less, from the standpoint of the transparency of the film. The density of the component (E) is preferably 895 kg/m$^3$ or more and 935 kg/m$^3$ or less, more preferably 900 kg/m$^3$ or more and 930 kg/m$^3$ or less, further preferably 905 kg/m$^3$ or more and 925 kg/m$^3$ or less, particularly preferably 910 kg/m$^3$ or more and 925 kg/m$^3$ or less.

The MFR of the component (E) is 0.5 g/10 min or more and 5 g/10 min or less. The MFR of the component (E) is preferably 0.8 g/10 min or more, more preferably 0.9 g/10 min or more, from the standpoint of the molding processability of the film, particularly from the standpoint of reducing extrusion load at the time of formation of the film. The MFR of the component (E) is preferably 4.0 g/10 min or less, more preferably 3.0 g/10 min or less, further preferably 2.5 g/10 min or less, from the standpoint of the strength of the film. The MFR of the component (E) is preferably 0.8 g/10 min or more and 4.0 g/10 min or less, more preferably 0.9 g/10 min or more and 3.0 g/10 min or less, further preferably 0.9 g/10 min or more and 2.5 g/10 min or less. In measurement of the MFR of the component (E), a sample obtained by blending about 1000 ppm of an antioxidant with the component (E) is usually used.

The MFRR of the component (E) is 31 or more and 150 or less. The MFRR of the component (E) is preferably 35 or more, more preferably 40 or more, further preferably 45 or more, from the standpoint of reducing extrusion load at the time of molding of the film. The MFRR of the component (E) is preferably 120 or less, more preferably 100 or less, from the standpoint of the strength of the film. The MFRR of the component (E) is preferably 35 or more and 120 or less, more preferably 40 or more and 100 or less, further preferably 45 or more and 100 or less, from the standpoint of reducing extrusion load at the time of molding of the film. In measurement of the MFRR of the component (E), a sample obtained by blending 1000 ppm of an antioxidant with the component (E) is usually used.

The ratio of the weight-average molecular weight to the number-average molecular weight (Mw/Mn) of the component (E) is preferably 3 or more, more preferably 3.5 or more, further preferably 4 or more, from the standpoint of more improving the slipperiness of the film. The Mw/Mn of the component (E) is preferably 15 or less, more preferably 13 or less, further preferably 11 or less, particularly preferably 9 or less, from the standpoint of the strength of the film. The Mw/Mn of the component (E) is preferably 3 or more and 15 or less, more preferably 3.5 or more and 13 or less, further preferably 4 or more and 11 or less, particularly preferably 4 or more and 9 or less. The molecular weight distribution (Mw/Mn) of the component (E) is measured by the same method as for the Mw/Mn of the component (A).

The Ea of the component (E) is preferably 30 kJ/mol or more, more preferably 40 kJ/mol or more, further preferably 50 kJ/mol or more, from the standpoint of the stability of bubbles at the time of formation of the film by an inflation film formation method. The Ea of the component (E) is preferably 80 kJ/mol or less, more preferably 75 kJ/mol or less, further preferably 70 kJ/mol or less, from the standpoint of the strength of the film. The Ea of the component (E) is preferably 30 kJ/mol or more and 80 kJ/mol or less, more preferably 40 kJ/mol or more and 75 kJ/mol or less, further preferably 50 kJ/mol or more and 70 kJ/mol or less. The Ea of the component (E) is measured by the same method as for the Ea of the component (A).

The component (E) can be produced by copolymerizing ethylene and an α-olefin in the presence of a metallocene-based polymerization catalyst or a Ziegler-Natta polymerization catalyst. From the standpoint of stability of bubbles at the time of forming a film by an inflation film forming method, the catalyst used for producing the component (E) is preferably a metallocene-based polymerization catalyst.

The metallocene-based olefin polymerization catalyst used for producing the component (E) is not particularly restricted, but catalysts for olefin polymerization which are the same as the olefin polymerization catalyst used for producing the component (A) are mentioned.

The method for producing the component (E) is not particularly restricted, and for example, the component (E) is obtained by copolymerizing ethylene and an α-olefin by a slurry polymerization method or a gas phase polymerization method in the presence of a polymerization catalyst obtained by contacting the component (H), the metallocene-based complex, the organic aluminum compound and the electron-donating compound described above. The component (E) is obtained by the presence of hydrogen at more than 1.1 mol % with respect to 100 mol % of ethylene during copolymerization. The polymerization method of the component (E) is preferably a gas phase polymerization method. Further, to the gas phase polymerization, triethylamine, triisobutylamine or tri-n-octylamine may be added as an electron donating compound.

The method for producing the ethylene-based resin composition is not particularly limited, and known blending methods may be mentioned. As a well-known blending method, a method of dry-blending each polymer, a method of melt-blending and the like are mentioned, for example. Examples of the dry blending method include methods using various blenders such as a Henschel mixer, a tumbler mixer and the like. Examples of the melt blending method include methods using various mixers such as a single-screw extruder, a twin-screw extruder, a Banbury mixer, a heat roll and the like.

EXAMPLES

Each item in examples and comparative examples was measured according to the following method.
[Component (H)]
(1) Elemental Analysis
Zn: A sample was charged in an aqueous sulfuric acid solution (concentration: 1 M) and then irradiated with ultrasonic waves to extract metal components. The resulting solution was quantified by an ICP emission analysis method.
F: A sample was burned in a flask filled with oxygen, the resulting combustion gas was absorbed into an aqueous sodium hydroxide solution (10%), and the resulting aqueous solution was quantified by an ion electrode method.
[Physical Property of Component (A)]
(2) Melt Flow Rate (MFR, Unit: g/10 Min)

MFR was measured by the method A according to a method prescribed in JIS K7210-1995 under conditions of a temperature of 190° C. and a load of 21.18 N.
(3) Density (Unit: Kg/m$^3$)
Density was measured by the method A according to a method prescribed in JIS K7112-1980 after performing annealing described in JIS K6760-1995.
(4) Mw/Mn, Mz/Mw
The polystyrene-equivalent weight-average molecular weight (Mw), number-average molecular weight (Mn) and z-average molecular weight (Mz) were determined by gel permeation chromatography (GPC) measurement. Mw was divided by Mn to obtain molecular weight distribution (Mw/Mn). Mz was divided by Mw to obtain Mz/Mw.
Apparatus: Waters 150C manufactured by Waters Corporation
Separation column: TOSOH TSKgelGMH$_6$-HT
Measurement temperature: 140° C.
Carrier: orthodichlorobenzene
Flow rate: 1.0 mL/min
Injection amount: 500 μL
Detector: differential refractometer
Molecular weight standard substance: standard polystyrene
(5) η*0.1/η*100
Using a strain-controlled rotary viscometer (rheometer), dynamic complex viscosities from an angular frequency of 0.1 rad/sec to 100 rad/sec were measured under the following conditions. Next, the dynamic complex viscosity (η*0.1) at an angular frequency of 0.1 rad/sec was divided by the dynamic complex viscosity (η*100) at an angular frequency of 100 rad/sec to obtain η η*0.1/η*100.
Temperature: 170° C.
Geometry: parallel plate
Plate diameter: 25 mm
Plate spacing: 1.5 to 2 mm
Strain: 5%
Angular frequency: 0.1 to 100 rad/second
Measurement atmosphere: nitrogen
(6) Activation Energy of Flow (Ea, Unit: kJ/Mol)
For the activation energy of the flow (Ea), the melt complex viscosity-angular frequency curve of an ethylene-α-olefin copolymer at each temperature T (unit: ° C.) was measured by a strain-controlled rotary viscometer (rheometer) under the following conditions (a) to (d) (unit of melt complex viscometer is Pa·sec, unit of angular frequency is rad/sec). Next, superposition was performed on the melt complex viscosity-angular frequency curve of an ethylene-α-olefin copolymer at 90° C., for every melt complex viscosity-angular frequency curve at each temperature (G), based on the temperature-time superposition principle, to obtain the shift factor($a_T$) at each temperature (T). Next, a first-order approximation of [ln($a_T$)] and [1/(T+273.16)] (the following formula (I)) was calculated from each temperature (T) and the shift factor ($a_T$) at each temperature (T) by a least square method. Next, the Ea was determined from the slope m of the first-order equation and the following formula (II).

$$\ln(a_T)=m(1/(T+273.16))+n \quad (I)$$

$$Ea=|0.008314 \times m| \quad (II)$$

$a_T$: shift factor
Ea: activation energy of flow (unit: kJ/mol)
T: temperature (unit: ° C.)
As a calculation software, Rhios V.4.4.4 from Reometrics Corporation was used. The Ea value was employed when the correlation coefficient r2 was not less than 0.99 when the equation (I) was calculated by a least square method from the value at each temperature (T). Measurement of the melt complex viscosity-angular frequency curve was carried out in a nitrogen atmosphere.

(a) Geometry: parallel plate, plate diameter 25 mm, plate spacing: 1.5 to 2 mm
(b) Strain: 5%
(c) Shear rate: 0.1 to 100 rad/second
(d) Temperature: 130° C., 150° C., 170° C., 190° C.

(7) Tensile Impact Strength (Unit: $kJ/m^2$)

The tensile impact strength of a 2 mm thick sheet compression-molded under the conditions of a molding temperature of 190° C., a preheating time of 10 minutes, a compression time of 5 minutes and a compression pressure of 5 MPa was measured according to ASTM D1822-68.

(8) Characteristic Relaxation Time ($\tau$) (Sec)

The melt complex viscosity-angular frequency curves at 130° C., 150° C., 170° C. and 190° C. were measured using viscoelasticity measuring apparatus (Rheometrics Mechanical Spectrometer RMS-800 manufactured by Rheometrics Corporation) under the following conditions. Next, a master curve of the melt complex viscosity-angular frequency curve at 190° C. was made from the resulting melt complex viscosity-angular frequency curves using Rhios V.4.4.4, a calculation software from Rheometrics Corporation. The characteristic relaxation time ($\tau$) was determined by approximating the resultant master curve by the following formula (5).

<Measurement Condition>
Geometry: parallel plate
Plate diameter: 25 mm
Plate spacing: 1.5 to 2 mm
Strain: 5%
Angular frequency: 0.1 to 100 rad/second
Measurement atmosphere: nitrogen (9) Melting Point (Tm, Unit: ° C.), Crystallization Temperature (Tc, Unit: ° C.)

Tm and Tc were measured by the following method using a thermal analysis apparatus differential scanning calorimeter (Diamond DSC manufactured by Perkin Elmer).

The melting point was determined as an endothermic peak of the heat flow curve observed in (stage 3), and the crystallization temperature was determined as an exothermic peak of the heat flow curve observed in (stage 2).

1) about 10 mg of a sample is kept under a nitrogen atmosphere at 150° C. for 5 minutes
2) cooling from 150° C. to 20° C. (5° C./min) kept for 2 minutes
3) temperature rising from 20° C. to 150° C. (5° C./min)

(10) Melt Tension (MT, Unit: cN)

A molten resin filled in a barrel with a diameter of 9.5 mm was extruded from an orifice having a diameter of 2.09 mm and a length of 8 mm at a temperature of 190° C. using a melt tension tester (manufactured by Toyo Seiki Seisakusho, Ltd.) at a piston lowering speed of 5.5 mm/min. The extruded molten resin was wound using a winding roll having a diameter of 50 mm at a winding rise speed of 40 rpm/min, and the tension immediately before the molten resin broke was measured. The maximum tension from the start of withdrawing until the filamentary component (A) was cut was taken as the melt tension.

(11) Limiting Viscosity ($[\eta]$, Unit: dl/g)

A polymer was dissolved in a tetralin solvent, and the limiting viscosity was measured at 135° C. using a Ubbelohde viscometer.

[Physical Property of Film]

(12) Haze, Unit: %

The haze was measured according to a method prescribed in ASTM D1003.

(13) Internal Haze, Unit: %

The internal haze was measured according to a method prescribed in ASTM D1003 with dimethyl phthalate filled in a quartz glass cell and the film immersed in dimethyl phthalate.

(14) External Haze, Unit: %

The value obtained by subtracting the internal haze from the haze was defined as the external haze.

(15) Tensile Strength at Break (Unit: MPa)

Test pieces were prepared in which the longitudinal direction was a withdrawing direction (MD) and a direction (TD) orthogonal to the MD direction, respectively, from the formed film, according to the sampling method for tensile cutting load measurement according to JIS K 6781 6.4. Using the obtained test piece, a tensile test was conducted under the conditions of 80 mm between chucks, 40 mm between marked lines, and 500 mm/min in tensile speed to determine the tensile strength at break.

(16) Tensile Elongation at Break (Unit: %)

Test pieces were prepared in which the longitudinal direction was a withdrawing direction (MD) and a direction (TD) orthogonal to the MD direction, respectively, from the formed film, according to the sampling method for tensile cutting load measurement according to JIS K 6781 6.4. Using the obtained test piece, a tensile test was conducted under the conditions of 80 mm between chucks, 40 mm between marked lines, and 500 mm/min in tensile speed to determine the tensile elongation at break.

(17) Tan θ (Slipperiness)

Two films of 160 mm (length)×80 mm (width) were cut out from the produced inflation film. One of the two films (hereinafter, referred to as sample film (1)) was placed on the inclined plate of a friction angle measurement device (manufactured by Toyo Seiki Seisakusho Co., Ltd.). At this time, the upper surface of the sample film (1) was a surface which was the inner surface of the tube at the time of forming the inflation film. The other film (hereinafter, sample film (2)) was attached to the lower surface of a thread (weight 1 kg) of 100 mm (length)×65 mm (width).

At this time, the sample film (2) was attached such that the thread surface was in contact with the surface of the sample film (2) which was the outer surface of the tube at the time of inflation film formation.

The sample film (2) attached to the thread was placed in contact with the sample film (1) placed on the inclined plate.

The inclined plate was inclined at an inclination rate of 2.7°/sec, and the angle 8 at which the thread started to move was measured and indicated by tan θ (surface-surface). The smaller the tan θ (face to face), the better the slipperiness of the film.

Since the friction angle measuring device cannot make θ larger than 70°, it is described as "unmeasurable" when the thread does not start to move when θ is 70.

(18) Tp(50) (Unit: %), Ra (Unit: μm), Ry (Unit: μm)

Using a laser microscope (VK-8500, manufactured by Keyence Corp.) and analysis software (VK shape analysis application version 1.06, from Keyence Corp.), the surface roughness curve of the film was measured by the following method, and Tp (50) was calculated.

1) A small amount of dimethyl phthalate was adhered to a slide glass, and a 20 mm×50 mm prepared inflation film was placed such that the inner surface of the tube at the time of inflation film forming was on top.

2) The objective lens of the laser microscope was set to 100 times, and the measurement conditions were set to the following conditions. For focus adjustment, after turning on the laser ON/OFF button, the sample table was adjusted up and down so that the laser became the narrowest, and then the laser ON/OFF button was turned off and measurement was started.

Shutter speed: Auto
Gain: Auto
Digital zoom: 1×
Optical zoom: 1×
VIEW MODE: Color Raw
RAN NODE: Color super depth
PITCH: 0.02 μm
Measurement range: 3 μm up and down 3) The measured image was smoothed under the following conditions.

Object to be processed: Height
Size: 5×5
Execution count: 1 time
File Type: Median 4) The measured image was corrected for inclination under the following conditions.

Correction method: Curved surface correction
Object to be processed: Height

5) The surface roughness analysis was carried out to obtain numerical values of Tp (50), Ra and Ry.

(19) Heat-Seal (HS) Strength (Unit: N/15 mm)

The films were stacked so that the surfaces that were the inner surface of the tube at the time of inflation film formation were in contact with each other, and heat sealing was performed so that the direction of the seal was parallel to the TD direction, using a heat sealer (manufactured by Tester Sangyo Co., Ltd.) under the following sealing conditions, to obtain a sample. After leaving the obtained sample to stand at 23° C. for 24 hours or more, a test piece having a seal portion in a direction perpendicular to the seal width direction was cut out (seal width×seal length=10 mm×15 mm). Next, the seal part of the obtained test piece was peeled 180° at a speed of 300 mm/min by a tensile tester to measure the heat seal strength per 15 mm width. The maximum value of the obtained heat seal strength was adopted. When the heat seal strength is 5 N/15 mm or more, the low temperature heat sealability is excellent.

<Heat-Seal Conditions>

Seal temperature: 110° C.
Seal time: 1 second
Seal width: 10 mm
Seal pressure: 100 kPa

[Moldability of Film]

(20) Resin Pressure (Unit: MPa), Motor Current (A)

The resin pressure of an extruder and the motor current when molding an inflation film with a thickness of 50 μm, using an inflation film molding machine manufactured by Placo Co., Ltd. (full-flight type screw single-screw extruder (diameter 30 mm, L/D=28), dice (die diameter 50 mm, lip gap 2.0 mm), double slit air ring), under processing conditions of a processing temperature of 170° C., an extrusion amount of 5.5 kg/hr, a frost line distance (FLD) of 200 mm and a blow ratio of 1.8, were measured. The lower the value, the better the moldability of the film.

[Production Example of Component (A)]

Example 1

(1) Production of Component (H)

The component (H) was produced in the same manner as for preparation of the component (A) of Example 1 (1) and (2) described in JP-A No. 2009-79180. As a result of elemental analysis, Zn=11% by weight and F=6.4% by weight.

(2) Production of Prepolymerization Catalyst Component

After adding 45.5 liters of butane to a previously nitrogen-purged autoclave having an internal volume of 210 liters equipped with a stirrer, 58.6 mmol of racemic-ethylenebis (1-indenyl)zirconium diphenoxide was added, and the autoclave was heated up to 50° C. and the mixture was stirred for 2 hours. Next, 1.17 kg of the component (H) obtained in the above (1) was added to the autoclave. Thereafter, the temperature of the autoclave was lowered to 31° C., and after the system was stabilized, 0.1 kg of ethylene and 0.1 liter of hydrogen (normal temperature and normal pressure) were added to the autoclave and subsequently, 234 mmol of triisobutylaluminum was added, and prepolymerization was started. Ethylene and hydrogen (normal temperature and normal pressure) were supplied to the autoclave for 30 minutes at 1.0 kg/hr and 2.0 liter/hr, respectively, and then the temperature was raised up to 50° C. and ethylene and hydrogen (normal temperature and normal pressure) were supplied to the autoclave at 5.2 kg/hr and 16.7 liter/hr. A total of 6.3 hours of prepolymerization was carried out. After completion of the prepolymerization, ethylene, butane, hydrogen and the like were purged, and the remaining solid was vacuum-dried at room temperature, to obtain a prepolymerization catalyst component containing 28.3 g of polyethylene per 1 g of the component (H). [η] of the polyethylene was 1.30 dl/g.

(3) Production of component (A) (LLDPE 1-1)

After drying under reduced pressure, a vacuum was applied to the inside of an autoclave having an internal volume of 3 liters equipped with a stirrer and purged with argon. Thereafter, to the autoclave was added hydrogen at a partial pressure of 0.010 MPa, and 90 ml of hexene-1 and 657 g of butane were added, and the temperature of the autoclave was raised up to 70° C. Thereafter, ethylene was added to the autoclave so that its partial pressure was 1.6 MPa to stabilize the system. To this was added 1.5 ml of a hexane solution of triisobutylaluminum adjusted to a concentration of 1 mmol/ml. Next, 0.75 ml of a toluene solution of triethylamine adjusted to a concentration of 0.1 mmol/ml was added. Furthermore, 2427.9 mg of the prepolymerization catalyst component obtained in Example 1 (2) was added. The polymerization was carried out at 70° C. for 90 minutes while feeding a mixed gas of ethylene/hydrogen (0.05 mol % of hydrogen) so as to keep the total pressure constant. The average amount of hydrogen was 0.47 mol % relative to 100 mol % of ethylene in the autoclave during polymerization. As a result, 355 g of a powder of ethylene-1-hexene copolymer (hereinafter referred to as LLDPE 1-1) was obtained. The polymerization activity per 1 g of the component (H) was 4282 g/g.

The LLDPE 1-1 powder was granulated under the conditions of a feed speed of 50 kg/hr, a screw rotation speed of 450 rpm, and a resin temperature of 200 to 230° C. using a 15 mm table-top micro-miniature extruder (LMEX manufactured by Magoshi Seimitsu Seisakusho Ltd.), to obtain pellets of LLDPE 1-1. The physical properties of the obtained LLDPE 1-1 pellets were evaluated, and the results are shown in Table 1.

Example 2

(1) Production of Component (A) (LLDPE 1-2)

After drying under reduced pressure, a vacuum was applied to the inside of an autoclave having an internal volume of 3 liters equipped with a stirrer and purged with argon. Thereafter, to the autoclave was added hydrogen at a partial pressure of 0.014 MPa, and 90 ml of hexene-1 and 657 g of butane were added, and the temperature of the autoclave was raised up to 70° C. Thereafter, ethylene was added to the autoclave so that its partial pressure was 1.6 MPa to stabilize the system. To this was added 1.5 ml of a hexane solution of triisobutylaluminum adjusted to a concentration of 1 mmol/ml. Next, 0.75 ml of a toluene solution of triethylamine adjusted to a concentration of 0.1 mmol/ml was added. Furthermore, 2446.7 mg of the prepolymerization catalyst component obtained in Example 1 (2) was added. The polymerization was carried out at 70° C. for 90 minutes while feeding a mixed gas of ethylene/hydrogen (0.05 mol % of hydrogen) so as to keep the total pressure constant. The average amount of hydrogen was 0.55 mol % relative to 100 mol % of ethylene in the autoclave during polymerization. As a result, 440 g of a powder of ethylene-1-hexene copolymer (hereinafter referred to as LLDPE 1-2) was obtained. The polymerization activity per 1 g of the component (H) was 5146 g/g. The LLDPE 1-2 powder was granulated under the same conditions as in Example 1(3), to obtain pellets of LLDPE 1-2. The physical properties of the obtained LLDPE 1-2 pellets were evaluated, and the results are shown in Table 1.

Example 3

(1) Production of Component (A) (LLDPE 1-3)

After drying under reduced pressure, a vacuum was applied to the inside of an autoclave having an internal volume of 3 liters equipped with a stirrer and purged with argon. Thereafter, to the autoclave was added hydrogen at a partial pressure of 0.020 MPa, and 90 ml of hexene-1 and 657 g of butane were added, and the temperature of the autoclave was raised up to 70° C. Thereafter, ethylene was added to the autoclave so that its partial pressure was 1.6 MPa to stabilize the system. To this was added 1.5 ml of a hexane solution of triisobutylaluminum adjusted to a concentration of 1 mmol/ml. Next, 0.75 ml of a toluene solution of triethylamine adjusted to a concentration of 0.1 mmol/ml was added. Furthermore, 2435.7 mg of the prepolymerization catalyst component obtained in Example 1 (2) was added. The polymerization was carried out at 70° C. for 90 minutes while feeding a mixed gas of ethylene/hydrogen (0.1 mol % of hydrogen) so as to keep the total pressure constant. The average amount of hydrogen was 0.97 mol % relative to 100 mol % of ethylene in the autoclave during polymerization. As a result, 440 g of a powder of ethylene-1-hexene copolymer (hereinafter referred to as LLDPE 1-3) was obtained. The polymerization activity per 1 g of the component (H) was 5295 g/g. The LLDPE 1-3 powder was granulated under the same conditions as in Example 1(3), to obtain pellets of LLDPE 1-3. The physical properties of the obtained LLDPE 1-3 pellets were evaluated, and the results are shown in Table 1.

Example 4

(1) Production of Component (A) (LLDPE 1-4)

After drying under reduced pressure, a vacuum was applied to the inside of an autoclave having an internal volume of 5 liters equipped with a stirrer and purged with argon. To the autoclave was added hydrogen at a partial pressure of 0.015 MPa, and 150 ml of hexene-1 and 1099 g of butane were added, and the temperature of the autoclave was raised up to 70° C. Thereafter, ethylene was added to the autoclave so that its partial pressure was 1.6 MPa to stabilize the system. To this was added 2.0 ml of a hexane solution of triisobutylaluminum adjusted to a concentration of 1 mmol/ml. Next, 1.0 ml of a toluene solution of triethylamine adjusted to a concentration of 0.1 mmol/ml was added. Furthermore, 1316.9 mg of the prepolymerization catalyst component obtained in Example 1 (2) was added. The polymerization was carried out at 70° C. for 3 hours while feeding a mixed gas of ethylene/hydrogen (0.13 mol % of hydrogen) so as to keep the total pressure constant. The average amount of hydrogen was 0.73 mol % relative to 100 mol % of ethylene in the autoclave during polymerization. As a result, 581 g of a powder of ethylene-1-hexene copolymer (hereinafter referred to as LLDPE 1-4) was obtained. The polymerization activity per 1 g of the component (H) was 12480 g/g. The LLDPE 1-4 powder was granulated under the same conditions as in Example 1(3), to obtain pellets of LLDPE 1-4. The physical properties of the obtained LLDPE 1-4 pellets were evaluated, and the results are shown in Table 1.

Example 5

(1) Production of Component (A) (LLDPE 1-5)

After drying under reduced pressure, a vacuum was applied to the inside of an autoclave having an internal volume of 5 liters equipped with a stirrer and purged with argon. To the autoclave was added hydrogen at a partial pressure of 0.020 MPa, and 150 ml of hexene-1 and 1099 g of butane were added, and the temperature of the autoclave was raised up to 70° C. Thereafter, ethylene was added to the autoclave so that its partial pressure was 1.6 MPa to stabilize the system. To this was added 3.0 ml of a hexane solution of triisobutylaluminum adjusted to a concentration of 1 mmol/ml. Next, 1.0 ml of a toluene solution of triethylamine adjusted to a concentration of 0.1 mmol/ml was added. Furthermore, 1490.3 mg of the prepolymerization catalyst component obtained in Example 1 (2) was added. The polymerization was carried out at 70° C. for 3 hours while feeding a mixed gas of ethylene/hydrogen (0.14 mol % of hydrogen) so as to keep the total pressure constant. The average amount of hydrogen was 1.00 mol % relative to 100 mol % of ethylene in the autoclave during polymerization. As a result, 559 g of a powder of ethylene-1-hexene copolymer (hereinafter referred to as LLDPE 1-5) was obtained. The polymerization activity per 1 g of the component (H) was 10619 g/g. The LLDPE 1-5 powder was granulated under the same conditions as in Example 1(3), to obtain pellets of LLDPE 1-5. The physical properties of the obtained LLDPE 1-5 pellets were evaluated, and the results are shown in Table 1.

Example 6

(1) Production of Prepolymerization Catalyst Component

After adding 41 liters of butane to a previously nitrogen-purged autoclave having an internal volume of 210 liters equipped with a stirrer, 60.9 mmol of racemic-ethylenebis (1-indenyl)zirconium diphenoxide was added, and the autoclave was heated up to 50° C. and the mixture was stirred for 2 hours. Next, 0.60 kg of the component (H) obtained in the above Example 1(1) was added to the autoclave. Thereafter, the temperature of the autoclave was lowered to 31° C., and after the system was stabilized, 0.1 kg of ethylene and 0.1 liter of hydrogen (normal temperature and normal pressure) were added to the autoclave and subsequently, 240 mmol of triisobutylaluminum was added, and prepolymerization was started. Ethylene and hydrogen (normal temperature and normal pressure) were supplied to the autoclave for 30 minutes at 0.5 kg/hr and 1.1 liter/hr, respectively, and then the temperature was raised up to 50° C. and ethylene and hydrogen (normal temperature and normal pressure) were supplied to the autoclave at 2.7 kg/hr and 8.2 liter/hr. A total of 10.0 hours of prepolymerization was carried out. After completion of the prepolymerization, ethylene, butane, hydrogen and the like were purged, and the remaining solid was vacuum-dried at room temperature, to obtain a prepolymerization catalyst component containing 39.6 g of polyethylene per 1 g of the component (H). [η] of the polyethylene was 1.17 dl/g.

(2) Production of Component (A) (LLDPE 1-6)

In the presence of the prepolymerization catalyst component obtained in (1) described above, copolymerization of ethylene, 1-butene and 1-hexene was carried out in a continuous fluidized bed gas phase polymerization apparatus, to obtain an ethylene-1-butene-1-hexene copolymer (hereinafter, referred to as LLDPE 1-6) powder. As the polymerization conditions, the polymerization temperature was 89° C.; the polymerization pressure was 2 MPa; the average of the hydrogen amount with respect to 100 mol % of ethylene was 0.21%; the molar ratio of 1-butene with respect to the sum of ethylene, 1-butene and 1-hexene was 1.36%, and the molar ratio of 1-hexene was 0.59%. During the polymerization, ethylene, 1-butene, 1-hexene and hydrogen were continuously fed to maintain the gas composition constant. In addition, the above-described prepolymerization catalyst component and triisobutylaluminum, and triethylamine (the molar ratio to triisobutylaluminum: 3%) were continuously fed, and the total powder weight of the fluidized bed was kept constant at 80 kg. The average polymerization time was 3.8 hours. The resultant powder of LLDPE 1-6 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-6. The physical properties of the resultant LLDPE 1-6 pellets were evaluated, and the results are shown in Table 2.

Example 7

(1) Production of Component (A) (LLDPE 1-7)

In the presence of the prepolymerization catalyst component obtained in Example 6(1), copolymerization of ethylene, 1-butene and 1-hexene was carried out in a continuous fluidized bed gas phase polymerization apparatus, to obtain an ethylene-1-butene-1-hexene copolymer (hereinafter, referred to as LLDPE 1-7) powder. As the polymerization conditions, the polymerization temperature was 89° C.; the polymerization pressure was 2 MPa; the average ratio of the hydrogen amount with respect to 100 mol % of ethylene was 0.07%; the molar ratio of 1-butene with respect to the sum of ethylene, 1-butene and 1-hexene was 1.23%, and the molar ratio of 1-hexene was 0.56%. During the polymerization, ethylene, 1-butene, 1-hexene and hydrogen were continuously fed to maintain the gas composition constant. In addition, the above-described prepolymerization catalyst component and triisobutylaluminum, and triethylamine (the molar ratio to triisobutylaluminum: 3%) were continuously fed, and the total powder weight of the fluidized bed was kept constant at 80 kg. The average polymerization time was 5.5 hours. The resultant powder of LLDPE 1-7 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-7. The physical properties of the resultant LLDPE 1-7 pellets were evaluated, and the results are shown in Table 2.

Example 8

(1) Production of Component (A) (LLDPE 1-8)

In the presence of the prepolymerization catalyst component obtained in Example 6(1), copolymerization of ethylene, 1-butene and 1-hexene was carried out in a continuous fluidized bed gas phase polymerization apparatus, to obtain an ethylene-1-butene-1-hexene copolymer (hereinafter, referred to as LLDPE 1-8) powder. As the polymerization conditions, the polymerization temperature was 89° C.; the polymerization pressure was 2 MPa; the average of the hydrogen amount with respect to 100 mol % of ethylene was 0.37%; the molar ratio of 1-butene with respect to the sum of ethylene, 1-butene and 1-hexene was 1.37%, and the molar ratio of 1-hexene was 0.69%. During the polymerization, ethylene, 1-butene, 1-hexene and water were continuously fed to maintain the gas composition constant. In addition, the above-described prepolymerization catalyst component and triisobutylaluminum, triethylamine (the molar ratio to triisobutylaluminum: 3%) and oxygen (the molar ratio to triisobutylaluminum: 24%) were continuously fed, and the total powder weight of the fluidized bed was kept constant at 80 kg. The average polymerization time was 4.0 hours. The resultant powder of LLDPE 1-8 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-8. The physical properties of the resultant pellets of LLDPE 1-8 were evaluated. The results are shown in Table 2.

Example 9

(1) Production of Component (A) (LLDPE 1-9)

In the presence of the prepolymerization catalyst component obtained in Example 6(1), copolymerization of ethylene, 1-butene and 1-hexene was carried out in a continuous fluidized bed gas phase polymerization apparatus, to obtain an ethylene-1-butene-1-hexene copolymer (hereinafter, referred to as LLDPE 1-9) powder. As the polymerization conditions, the polymerization temperature was 89° C.; the polymerization pressure was 2 MPa; the average of the hydrogen amount with respect to 100 mol % of ethylene was 0.16%; the molar ratio of 1-butene with respect to the sum of ethylene, 1-butene and 1-hexene was 1.27%, and the molar ratio of 1-hexene was 0.58%. During the polymerization, ethylene, 1-butene, 1-hexene and water were continuously fed to maintain the gas composition constant. In addition, the above-described prepolymerization catalyst component and triisobutylaluminum, triethylamine (the molar ratio to triisobutylaluminum: 3%) and oxygen (the molar ratio to triisobutylaluminum: 28%) were continuously fed, and the total powder weight of the fluidized bed was kept constant at 80 kg. The average polymerization time was 5.3 hours. The resultant powder of LLDPE 1-9 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-9. The physical properties of the resultant pellets of LLDPE 1-9 were evaluated. The results are shown in Table 2.

Example 10

(1) Production of Component (A) (LLDPE 1-10)

In the presence of the prepolymerization catalyst component obtained in Example 6(1), copolymerization of ethylene and 1-hexene was carried out by a continuous fluidized bed gas phase polymerization apparatus, to obtain an ethylene-1-hexene copolymer (hereinafter, referred to as LLDPE 1-10) powder. As the polymerization conditions, the polymerization temperature was 96° C., the polymerization pressure was 2 MPa, the average of the hydrogen amount with respect to 100 mol % of ethylene was 0.56%, and the molar ratio of 1-hexene with respect to the sum of ethylene and 1-hexene was 1.09%. During the polymerization, ethylene, 1-hexene and hydrogen were continuously fed to maintain the gas composition constant. In addition, the above-described prepolymerization catalyst component and triisobutylaluminum, triethylamine (the molar ratio to triisobutylaluminum: 30%) and oxygen (the molar ratio to triisobutylaluminum: 12%) were continuously fed, and the total powder weight of the fluidized bed was kept constant at 80 kg. The average polymerization time was 3.4 hours. The resultant powder of LLDPE 1-10 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-10. The physical properties of the resultant LLDPE 1-10 pellets were evaluated, and the results are shown in Table 3.

Example 11

(1) Production of Component (A) (LLDPE 1-11)

In the presence of the prepolymerization catalyst component obtained in Example 6(1) described above, copolymerization of ethylene and 1-hexene was carried out by a continuous fluidized bed gas phase polymerization apparatus, to obtain an ethylene-1-hexene copolymer (hereinafter, referred to as LLDPE 1-11) powder. As the polymerization conditions, the polymerization temperature was 96° C., the polymerization pressure was 2 MPa, the average of the hydrogen amount with respect to 100 mol % of ethylene was 0.40%, and the molar ratio of 1-hexene with respect to the sum of ethylene and 1-hexene was 1.05%. During the polymerization, ethylene, 1-hexene and hydrogen were continuously fed to keep the gas composition constant. In addition, the above-described prepolymerization catalyst component and triisobutylaluminum, triethylamine (the molar ratio to triisobutylaluminum: 30%) and oxygen (the molar ratio to triisobutylaluminum: 12%) were continuously fed, and the total powder weight of the fluidized bed was kept constant at 80 kg. The average polymerization time was 3.7 hours. The resultant powder of LLDPE 1-11 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-11. The physical properties of the resultant LLDPE 1-11 pellets were evaluated, and the results are shown in Table 3.

Example 12

(1) Production of Component (A) (LLDPE 1-12)

In the presence of the prepolymerization catalyst component obtained in Example 6(1), copolymerization of ethylene and 1-hexene was carried out by a continuous fluidized bed gas phase polymerization apparatus, to obtain an ethylene-1-hexene copolymer (hereinafter, referred to as LLDPE 1-12) powder. As the polymerization conditions, the polymerization temperature was 96° C., the polymerization pressure was 2 MPa, the average of the hydrogen amount with respect to 100 mol % of ethylene was 0.36%, and the molar ratio of 1-hexene with respect to the sum of ethylene and 1-hexene was 1.12%. During the polymerization, ethylene, 1-hexene and hydrogen were continuously fed to keep the gas composition constant. In addition, the above-described prepolymerization catalyst component and triisobutylaluminum, triethylamine (the molar ratio to triisobutylaluminum: 30%) and oxygen (the molar ratio to triisobutylaluminum: 24%) were continuously fed, and the total powder weight of the fluidized bed was kept constant at 80 kg. The average polymerization time was 6.4 hours. The resultant powder of LLDPE 1-12 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-12. The physical properties of the resultant LLDPE 1-12 pellets were evaluated, and the results are shown in Table 3.

Example 13

(1) Production of Component (A) (LLDPE 1-13)

In the presence of the prepolymerization catalyst component obtained in Example 6(1), copolymerization of ethylene and 1-hexene was carried out by a continuous fluidized bed gas phase polymerization apparatus, to obtain an ethylene-1-hexene copolymer (hereinafter, referred to as LLDPE 1-13) powder. As the polymerization conditions, the polymerization temperature was 96° C., the polymerization pressure was 2 MPa, the average of the hydrogen amount with respect to 100 mol % of ethylene was 0.35%, and the molar ratio of 1-hexene with respect to the sum of ethylene and 1-hexene was 1.12%. During the polymerization, ethylene, 1-hexene and hydrogen were continuously fed to keep the gas composition constant. In addition, the above-described prepolymerization catalyst component and triisobutylaluminum, triethylamine (the molar ratio to triisobutylaluminum: 31%) and oxygen (the molar ratio to triisobutylaluminum: 18%) were continuously fed, and the total powder weight of the fluidized bed was kept constant at 80 kg. The average polymerization time was 8.2 hours. The resultant powder of LLDPE 1-13 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-13. The physical properties of the resultant LLDPE 1-13 pellets were evaluated, and the results are shown in Table 3.

Example 14

(1) Production of Component (A) (LLDPE 1-14)

In the presence of the prepolymerization catalyst component obtained in Example 6(1), copolymerization of ethylene and 1-hexene was carried out by a continuous fluidized bed gas phase polymerization apparatus, to obtain an ethylene-1-hexene copolymer (hereinafter, referred to as LLDPE 1-14) powder. As the polymerization conditions, the polymerization temperature was 96° C., the polymerization pressure was 2 MPa, the average of the hydrogen amount with respect to 100 mol % of ethylene was 0.30%, and the molar ratio of 1-hexene with respect to the sum of ethylene and 1-hexene was 0.86%. During the polymerization, ethylene, 1-hexene and hydrogen were continuously fed to keep the gas composition constant. In addition, the above-described prepolymerization catalyst component and triisobutylaluminum, triethylamine (the molar ratio to triisobutylaluminum: 29%) and oxygen (the molar ratio to triisobutylaluminum: 21%) were continuously fed, and the total powder weight of the fluidized bed was kept constant at 80 kg. The average polymerization time was 3.7 hours. The resultant powder of LLDPE 1-14 was granulated using an extruder (LCM50 manufactured by KOBE Steel, Ltd.) under conditions of a feed speed of 50 kg/hr, a screw rotation number of 450 rpm, a gate opening of 50%, a suction pressure of 0.1 MPa and a resin temperature of 200 to 230° C., to obtain pellets of LLDPE 1-14. The physical properties of the resultant LLDPE 1-14 pellets were evaluated, and the results are shown in Table 4.

[Inflation Film Molding]

The following compounds were used as the component (B) and the component (C) described in examples.

Component (B)

Ethylene-1-hexene copolymer 2-1 (LLDPE 2-1): metallocene catalyst linear low density polyethylene Sumikacene E FV203N (manufactured by Sumitomo Chemical Co., Ltd., ethylene-1-hexene copolymer (no additive added), MFR 2.0 g/10 min, density 913 kg/m$^3$, MFRR=16.7)

Ethylene-1-hexene copolymer 2-2 (LLDPE 2-2): metallocene catalyst linear low density polyethylene Sumikacene E FV205 (manufactured by Sumitomo Chemical Co., Ltd., ethylene-1-hexene copolymer (no lubricant and anti-blocking agent added), MFR 2.0 g/10 min, density 922 kg/m$^3$, MFRR=16.8)

Component (C)

High pressure low density polyethylene 1 (LDPE 1): high pressure low density polyethylene Sumikacene F200-0 (manufactured by Sumitomo Chemical Co., Ltd., high pressure low density polyethylene (no additive added), MFR 2.0 g/10 min, density 923 kg/m$^3$, MFRR=53)

High pressure low density polyethylene 2 (LDPE 2): high pressure low density polyethylene Sumikacene G201-F (manufactured by Sumitomo Chemical Co., Ltd., high pressure low density polyethylene (no additive added), MFR 2.0 g/10 min, density 919 kg/m$^3$, MFRR=41)

Example 15

LLDPE 1-1, LLDPE 2-1 and LDPE 1 were mixed by a tumble mixer at a blending composition shown in Table 5. Next, the resultant mixture was processed using an inflation film molding machine manufactured by Placo Co., Ltd. (full flight type screw single screw extruder (diameter 30 mmφ, L/D=28), dice (die diameter 50 mmφ, lip gap 2.0 mm), double slit air ring) under processing conditions of a processing temperature of 170° C., an extrusion amount of 5.5 kg/hr, a frost line distance (FLD) of 200 mm and a blow ratio of 1.8, to mold an inflation film with a thickness of 50 μm. The physical properties of the resultant inflation film are shown in Table 5.

Example 16

An inflation film was obtained in the same manner as in Example 15, except that LLDPE 1-2, LLDPE 2-1 and LDPE 1 were mixed by a tumble mixer at a blending composition shown in Table 5. The physical properties of the resultant inflation film are shown in Table 5.

Example 17

An inflation film was obtained in the same manner as in Example 15, except that LLDPE 1-3, LLDPE 2-1 and LDPE 1 were mixed by a tumble mixer at a blending composition shown in Table 5. The physical properties of the resultant inflation film are shown in Table 5.

Example 18

An inflation film was obtained in the same manner as in Example 15, except that LLDPE 1-4, LLDPE 2-2 and LDPE 1 were mixed by a tumble mixer at a blending composition shown in Table 14. The physical properties of the resultant inflation film are shown in Table 14.

Example 19

An inflation film was obtained in the same manner as in Example 15, except that LLDPE 1-5, LLDPE 2-2 and LDPE 1 were mixed by a tumble mixer at a blending composition shown in Table 14. The physical properties of the resultant inflation film are shown in Table 14.

Example 20

An inflation film was obtained in the same manner as in Example 15, except that LLDPE 1-6, LLDPE 2-1 and LDPE 1 were mixed by a tumble mixer at a blending composition shown in Table 6. The physical properties of the resultant inflation film are shown in Table 6.

Example 21

An inflation film was obtained in the same manner as in Example 15, except that LLDPE 1-7, LLDPE 2-1 and LDPE 1 were mixed by a tumble mixer at a blending composition shown in Table 6. The physical properties of the resultant inflation film are shown in Table 6.

Example 22

An inflation film was obtained in the same manner as in Example 15, except that LLDPE 1-6, LLDPE 2-2 and LDPE 2 were mixed by a tumble mixer at a blending composition shown in Table 15. The physical properties of the resultant inflation film are shown in Table 15.

Example 23

An inflation film was obtained in the same manner as in Example 15, except that LLDPE 1-7, LLDPE 2-2 and LDPE 2 were mixed by a tumble mixer at a blending composition

Example 24

An inflation film was obtained in the same manner as in Example 15, except that LLDPE 1-8, LLDPE 2-1 and LDPE 1 were mixed by a tumble mixer at a blending composition shown in Table 7. The physical properties of the resultant inflation film are shown in Table 7.

Example 25

An inflation film was obtained in the same manner as in Example 15, except that LLDPE 1-8, LLDPE 2-1 and LDPE 1 were mixed by a tumble mixer at a blending composition shown in Table 7. The physical properties of the resultant inflation film are shown in Table 7.

Example 26

An inflation film was obtained in the same manner as in Example 15, except that LLDPE 1-9, LLDPE 2-1 and LDPE 1 were mixed by a tumble mixer at a blending composition shown in Table 7. The physical properties of the resultant inflation film are shown in Table 7.

Example 27

An inflation film was obtained in the same manner as in Example 15, except that LLDPE 1-9, LLDPE 2-1 and LDPE 1 were mixed by a tumble mixer at a blending composition shown in Table 8. The physical properties of the resultant inflation film are shown in Table 8.

Example 28

An inflation film was obtained in the same manner as in Example 15, except that LLDPE 1-10, LLDPE 2-1 and LDPE 1 were mixed by a tumble mixer at a blending composition shown in Table 9. The physical properties of the resultant inflation film are shown in Table 9.

Example 29

An inflation film was obtained in the same manner as in Example 15, except that LLDPE 1-10 and LLDPE 2-1 were mixed by a tumble mixer at a blending composition shown in Table 9. The physical properties of the resultant inflation film are shown in Table 9.

Example 30

An inflation film was obtained in the same manner as in Example 15, except that LLDPE 1-11, LLDPE 2-1 and LDPE 1 were mixed by a tumble mixer at a blending composition shown in Table 9. The physical properties of the resultant inflation film are shown in Table 9.

Example 31

An inflation film was obtained in the same manner as in Example 15, except that LLDPE 1-11 and LLDPE 2-1 were mixed by a tumble mixer at a blending composition shown in Table 10. The physical properties of the resultant inflation film are shown in Table 10.

Example 32

An inflation film was obtained in the same manner as in Example 15, except that LLDPE 1-14, LLDPE 2-1 and LDPE 1 were mixed by a tumble mixer at a blending composition shown in Table 10. The physical properties of the resultant inflation film are shown in Table 10.

Example 33

An inflation film was obtained in the same manner as in Example 15, except that LLDPE 1-14 and LLDPE 2-1 were mixed by a tumble mixer at a blending composition shown in Table 10. The physical properties of the resultant inflation film are shown in Table 10.

Example 34

An inflation film was obtained in the same manner as in Example 15, except that LLDPE 1-12, LLDPE 2-1 and LDPE 1 were mixed by a tumble mixer at a blending composition shown in Table 11. The physical properties of the resultant inflation film are shown in Table 11.

Example 35

An inflation film was obtained in the same manner as in Example 15, except that LLDPE 1-12, LLDPE 2-1 and LDPE 1 were mixed by a tumble mixer at a blending composition shown in Table 11. The physical properties of the resultant inflation film are shown in Table 11.

Example 36

An inflation film was obtained in the same manner as in Example 15, except that LLDPE 1-12 and LLDPE 2-1 were mixed by a tumble mixer at a blending composition shown in Table 11. The physical properties of the resultant inflation film are shown in Table 11.

Example 37

An inflation film was obtained in the same manner as in Example 15, except that LLDPE 1-13, LLDPE 2-1 and LDPE 1 were mixed by a tumble mixer at a blending composition shown in Table 11. The physical properties of the resultant inflation film are shown in Table 11.

Example 38

An inflation film was obtained in the same manner as in Example 15, except that LLDPE 1-13, LLDPE 2-1 and LDPE 1 were mixed by a tumble mixer at a blending composition shown in Table 11. The physical properties of the resultant inflation film are shown in Table 11.

Example 39

An inflation film was obtained in the same manner as in Example 15, except that LLDPE 1-13 and LLDPE 2-1 were mixed by a tumble mixer at a blending composition shown in Table 12. The physical properties of the resultant inflation film are shown in Table 13.

Example 40

An inflation film was obtained in the same manner as in Example 15, except that LLDPE 1-10, LLDPE 2-1 and LDPE 2 were mixed by a tumble mixer at a blending composition shown in Table 13. The physical properties of the resultant inflation film are shown in Table 13.

Example 41

An inflation film was obtained in the same manner as in Example 15, except that LLDPE 1-11, LLDPE 2-1 and LDPE 2 were mixed by a tumble mixer at a blending composition shown in Table 13. The physical properties of the resultant inflation film are shown in Table 13.

Example 42

An inflation film was obtained in the same manner as in Example 15, except that LLDPE 1-11, LLDPE 2-1 and LDPE 2 were mixed by a tumble mixer at a blending composition shown in Table 13. The physical properties of the resultant inflation film are shown in Table 13.

Example 43

An inflation film was obtained in the same manner as in Example 15, except that LLDPE 1-10, LLDPE 2-2 and LDPE 1 were mixed by a tumble mixer at a blending composition shown in Table 16. The physical properties of the resultant inflation film are shown in Table 16.

Example 44

An inflation film was obtained in the same manner as in Example 15, except that LLDPE 1-10, LLDPE 2-2 and LDPE 1 were mixed by a tumble mixer at a blending composition shown in Table 16. The physical properties of the resultant inflation film are shown in Table 16.

Example 45

An inflation film was obtained in the same manner as in Example 15, except that LLDPE 1-10 and LLDPE 2-2 were mixed by a tumble mixer at a blending composition shown in Table 16. The physical properties of the resultant inflation film are shown in Table 16.

Example 46

An inflation film was obtained in the same manner as in Example 15, except that LLDPE 1-12, LLDPE 2-2 and LDPE 1 were mixed by a tumble mixer at a blending composition shown in Table 16. The physical properties of the resultant inflation film are shown in Table 16.

Example 47

An inflation film was obtained in the same manner as in Example 15, except that LLDPE 1-12, LLDPE 2-2 and LDPE 1 were mixed by a tumble mixer at a blending composition shown in Table 16. The physical properties of the resultant inflation film are shown in Table 16.

Example 48

An inflation film was obtained in the same manner as in Example 15, except that LLDPE 1-12 and LLDPE 2-2 were mixed by a tumble mixer at a blending composition shown in Table 17. The physical properties of the resultant inflation film are shown in Table 17.

Example 49

An inflation film was obtained in the same manner as in Example 15, except that LLDPE 1-10, LLDPE 2-2 and LDPE 2 were mixed by a tumble mixer at a blending composition shown in Table 18. The physical properties of the resultant inflation film are shown in Table 18.

Example 50

An inflation film was obtained in the same manner as in Example 15, except that LLDPE 1-10, LLDPE 2-2 and LDPE 2 were mixed by a tumble mixer at a blending composition shown in Table 18. The physical properties of the resultant inflation film are shown in Table 18.

Example 51

An inflation film was obtained in the same manner as in Example 15, except that LLDPE 1-12, LLDPE 2-2 and LDPE 2 were mixed by a tumble mixer at a blending composition shown in Table 18. The physical properties of the resultant inflation film are shown in Table 18.

Example 52

An inflation film was obtained in the same manner as in Example 15, except that LLDPE 1-12, LLDPE 2-2 and LDPE 2 were mixed by a tumble mixer at a blending composition shown in Table 18. The physical properties of the resultant inflation film are shown in Table 18.

Comparative Example 1

An inflation film was obtained in the same manner as in Example 15, except that LLDPE 2-1 and LDPE 1 were mixed by a tumble mixer at a blending composition shown in Table 13. The physical properties of the resultant inflation film are shown in Table 13.

Comparative Example 2

An inflation film was obtained in the same manner as in Example 15, except that LLDPE 2-2 and LDPE 1 were mixed by a tumble mixer at a blending composition shown in Table 19. The physical properties of the resultant inflation film are shown in Table 19.

Comparative Example 3

An inflation film was obtained in the same manner as in Example 15, except that LLDPE 2-2 and LDPE 2 were mixed by a tumble mixer at a blending composition shown in Table 19. The physical properties of the resultant inflation film are shown in Table 19.

TABLE 1

|  |  | LLDPE 1-1 | LLDPE 1-2 | LLDPE 1-3 | LLDPE 1-4 | LLDPE 1-5 |
|---|---|---|---|---|---|---|
| MFR | g/10 min | 0.004 | 0.006 | 0.024 | 0.007 | 0.02 |
| density | kg/m$^3$ | 922.4 | 923.4 | 926.4 | 926.3 | 925.3 |
| [$\eta^0$] | Pa·sec | $1.2 \times 10^6$ | $1.3 \times 10^6$ | $5.0 \times 10^5$ | $7.3 \times 10^5$ | $6.3 \times 10^5$ |
| Ea | kJ/mol | 86 | 92 | 73 | 80 | 77 |
| Mw/Mn | — | — | 6.1 | 7.4 | 8.6 | 8.2 |
| Mz/Mw | — | — | 2.4 | 2.5 | 2.5 | 2.5 |
| [$\eta$] | dl/g | 1.80 | 1.81 | 1.50 | 1.59 | 1.53 |
| τ | second | 38.2 | 43.7 | 23.6 | 32.5 | 27.9 |
| $\eta*0.1/\eta*100$ | — | 147 | 151 | 110 | 120 | 112 |
| tensile impact strength | kJ/m$^2$ | 1239 | 1155 | 885 | 1028 | 947 |
| Tm | °C. | 111.9 | 112.1 | 113.9 | 113.9 | 113.0 |
| Tc | °C. | 104.9 | 105.7 | 107.0 | 107.4 | 106.6 |

TABLE 2

|  |  | LLDPE 1-6 | LLDPE 1-7 | LLDPE 1-8 | LLDPE 1-9 |
|---|---|---|---|---|---|
| MFR | g/10 min | 0.055 | 0.0325 | 0.024 | 0.0053 |
| density | kg/m$^3$ | 924.2 | 923.8 | 924.8 | 926.0 |
| [$\eta^0$] | Pa·sec | $3.6 \times 10^5$ | $7.7 \times 10^5$ | $5.0 \times 10^5$ | $1.1 \times 10^5$ |
| Ea | kJ/mol | 84 | 97 | 78 | 83 |
| Mw/Mn | — | 7.2 | 8.1 | 7.8 | 6.1 |
| Mz/Mw | — | 2.7 | 2.7 | 2.7 | 2.6 |
| [$\eta$] | dl/g | 1.53 | 1.76 | 1.50 | 1.75 |
| τ | second | 34.2 | 61.5 | 34.8 | 63.3 |
| $\eta*0.1/\eta*100$ | — | 91 | 103 | 113 | 147 |
| tensile impact strength | kJ/m$^2$ | 897 | 961 | 806 | 906 |
| Tm | °C. | 111.9 | 111.9 | 112.4 | 114.5 |
| Tc | °C. | 109.2 | 109.6 | 106.9 | 108.6 |

TABLE 3

|  |  | LLDPE 1-10 | LLDPE 1-11 | LLDPE 1-12 | LLDPE 1-13 |
|---|---|---|---|---|---|
| MFR | g/10 min | 0.021 | 0.041 | 0.047 | 0.015 |
| density | kg/m$^3$ | 924.5 | 925 | 924.7 | 925.3 |
| [$\eta^0$] | Pa·sec | $3.8 \times 10^5$ | $5.5 \times 10^5$ | $4.9 \times 10^5$ | $4.3 \times 10^5$ |
| Ea | kJ/mol | 79 | 78 | 77 | 71 |
| Mw/Mn | — | 6.5 | 6.9 | 7.1 | 6.7 |
| Mz/Mw | — | 2.6 | 2.6 | 2.6 | 2.6 |
| [$\eta$] | dl/g | 1.44 | 1.57 | 1.56 | 1.55 |
| τ | second | 24.9 | 32.7 | 32.3 | 33.0 |
| $\eta*0.1/\eta*100$ | — | 108 | 122 | 122 | 121 |
| tensile impact strength | kJ/m$^2$ | 983 | 975 | 986 | 950 |
| Tm | °C. | 111.9 | 113.4 | 113.7 | 114.1 |
| Tc | °C. | 106.0 | 107.5 | 107.8 | 108.0 |

TABLE 4

|  |  | LLDPE 1-14 |
|---|---|---|
| MFR | g/10 min | 0.0072 |
| density | kg/m$^3$ | 926.3 |
| [$\eta^0$] | Pa·sec | $6.3 \times 10^5$ |
| Ea | kJ/mol | 70 |
| Mw/Mn | — | 6.6 |
| Mz/Mw | — | 2.6 |
| [$\eta$] | dl/g | 1.66 |
| τ | second | 42.5 |
| $\eta*0.1/\eta*100$ | — | 121 |
| tensile impact strength | kJ/m$^2$ | 958 |
| Tm | °C. | 115.5 |
| Tc | °C. | 109.1 |

TABLE 5

| resin composition |  |  | Example 15 | Example 16 | Example 17 |
|---|---|---|---|---|---|
| LLDPE 2-1 | % by weight |  | 80 | 80 | 80 |
| LDPE 1 |  |  | 15 | 15 | 15 |
| LLDPE 1-1 |  |  | 5 |  |  |
| LLDPE 1-2 |  |  |  | 5 |  |
| LLDPE 1-3 |  |  |  |  | 5 |
| resin pressure | MPa |  | 31 | 32 | 31 |
| motor current | A |  | 12 | 13 | 12 |
| resin density | kg/m$^3$ |  | 915.0 | 915.0 | 915.2 |
| total HAZE | % |  | 7.1 | 7.3 | 6.1 |
| internal HAZE | % |  | 0.5 | 0.6 | 0.6 |
| external HAZE | % |  | 6.6 | 6.7 | 5.5 |
| tanθ (face to face) | — |  | 1.32 | 1.31 | 1.81 |
| tensile strength at break | MD | MPa | 57 | 56 | 56 |
|  | TD | MPa | 59 | 53 | 58 |
| tensile elongation at break | MD | % | 653 | 660 | 638 |
|  | TD | % | 720 | 675 | 690 |

TABLE 6

| resin composition |  | Example 20 | Example 21 |
|---|---|---|---|
| LLDPE 2-1 | % by weight | 80 | 80 |
| LDPE 1 |  | 10 | 10 |
| LLDPE 1-6 |  | 10 |  |
| LLDPE 1-7 |  |  | 10 |
| resin pressure | MPa | 31 | 31 |
| motor current | A | 14 | 14 |
| resin density | kg/m$^3$ | 915.1 | 915.1 |
| total HAZE | % | 9.1 | 8.0 |
| internal HAZE | % | 0.6 | 0.6 |
| external HAZE | % | 8.5 | 7.5 |
| tanθ (face to face) | — | 1.83 | 2.07 |
| tensile strength at break | MD MPa | 46 | 47 |
|  | TD MPa | 48 | 47 |
| tensile elongation at break | MD % | 620 | 624 |
|  | TD % | 676 | 655 |
| HS strength | N/15 mm | 7.47 |  |

TABLE 6-continued

| resin composition | | Example 20 | Example 21 |
|---|---|---|---|
| Tp(50) | % | | 13.9 |
| Ra | μm | | 0.044 |
| Ry | μm | | 0.475 |

TABLE 7

| resin composition | | Example 24 | Example 25 | Example 26 |
|---|---|---|---|---|
| LLDPE 2-1 | % by weight | 80 | 80 | 80 |
| LDPE 1 | | 15 | 10 | 15 |
| LLDPE 1-8 | | | 10 | |
| LLDPE 1-9 | | 5 | | 5 |
| resin pressure | MPa | 28 | 28 | 28 |
| motor current | A | 13 | 14 | 14 |
| resin density | kg/m³ | 915.1 | 915.2 | 915.2 |
| total HAZE | % | 7.2 | 9.9 | 10.2 |
| internal HAZE | % | 0.8 | 0.7 | 0.7 |
| external HAZE | % | 6.4 | 9.2 | 9.5 |
| tanθ (face to face) | — | 2.46 | 1.53 | 1.97 |
| tensile strength at break | MD MPa | 43 | 45 | 44 |
| | TD MPa | 43 | 46 | 45 |
| tensile elongation at break | MD % | 617 | 623 | 632 |
| | TD % | 665 | 666 | 673 |
| HS strength | N/15 mm | | 7.46 | |
| Tp(50) | % | | 10.7 | |
| Ra | μm | | 0.047 | |
| Ry | μm | | 0.453 | |

TABLE 8

| resin composition | | Example 27 |
|---|---|---|
| LLDPE 2-1 | % by weight | 80 |
| LDPE 1 | | 10 |
| LLDPE 1-9 | | 10 |
| resin pressure | MPa | 29 |
| motor current | A | 14 |
| resin density | kg/m³ | 915.3 |
| total HAZE | % | 16.8 |
| internal HAZE | % | 0.7 |
| external HAZE | % | 16.2 |
| tanθ (face to face) | — | 1.35 |
| tensile strength at break | MD MPa | 44 |
| | TD MPa | 38 |
| tensile elongation at break | MD % | 633 |
| | TD % | 615 |

TABLE 9

| resin composition | | Example 28 | Example 29 | Example 30 |
|---|---|---|---|---|
| LLDPE 2-1 | % by weight | 80 | 80 | 80 |
| LDPE 1 | | 10 | | 10 |
| LLDPE 1-10 | | 10 | 20 | |
| LLDPE 1-11 | | | | 10 |
| resin pressure | MPa | 28 | 29 | 29 |
| motor current | A | 14 | 14 | 14 |
| resin density | kg/m³ | 915.2 | 915.3 | 915.2 |
| total HAZE | % | 8.1 | 13.5 | 10.5 |
| internal HAZE | % | 0.6 | 0.6 | 0.6 |
| external HAZE | % | 7.5 | 12.9 | 9.9 |
| tanθ (face to face) | — | 2.18 | 1.17 | 2.03 |
| tensile strength at break | MD MPa | 47 | 45 | 47 |
| | TD MPa | 41 | 45 | 44 |
| tensile elongation at break | MD % | 641 | 611 | 639 |
| | TD % | 644 | 637 | 655 |
| HS strength | N/15 mm | 7.46 | 7.74 | 7.85 |
| Tp(50) | % | 11.7 | 2.7 | 15.3 |
| Ra | μm | 0.041 | 0.053 | 0.054 |
| Ry | μm | 0.350 | 0.605 | 0.473 |

TABLE 10

| resin composition | | Example 31 | Example 32 | Example 33 |
|---|---|---|---|---|
| LLDPE 2-1 | % by weight | 80 | 80 | 80 |
| LDPE 1 | | | 10 | |
| LLDPE 1-11 | | 20 | | |
| LLDPE 1-14 | | | 10 | 20 |
| resin pressure | MPa | 30 | 29 | 30 |
| motor current | A | 14 | 14 | 14 |
| resin density | kg/m³ | 915.4 | 915.3 | 915.7 |
| total HAZE | % | 18.0 | 15.4 | 25.4 |
| internal HAZE | % | 0.7 | 0.7 | 0.7 |
| external HAZE | % | 17.3 | 14.7 | 24.7 |
| tanθ (face to face) | — | 1.33 | 1.93 | 1.34 |
| tensile strength at break | MD MPa | 48 | 45 | 46 |
| | TD MPa | 49 | 47 | 44 |
| tensile elongation at break | MD % | 636 | 636 | 623 |
| | TD % | 669 | 674 | 632 |
| HS strength | N/15 mm | 7.83 | 7.93 | 7.54 |
| Tp(50) | % | 11.1 | 6.9 | 14.6 |
| Ra | μm | 0.065 | 0.067 | 0.102 |
| Ry | μm | 0.687 | 0.693 | 1.063 |

TABLE 11

| resin composition | | Example 34 | Example 35 | Example 36 | Example 37 | Example 38 |
|---|---|---|---|---|---|---|
| LLDPE 2-1 | % by weight | 80 | 80 | 80 | 80 | 80 |
| LDPE 1 | | 15 | 10 | | 15 | 10 |
| LLDPE 1-12 | | 5 | 10 | 20 | | |
| LLDPE 1-13 | | | | | 5 | 10 |
| resin pressure | MPa | 28 | 29 | 30 | 28 | 28 |
| motor current | A | 13 | 14 | 14 | 13 | 13 |
| resin density | kg/m³ | 914.5 | 914.8 | 915.3 | 914.5 | 914.8 |
| total HAZE | % | 7.7 | 11.1 | 19.2 | 7.7 | 11.5 |
| internal HAZE | % | 0.6 | 0.6 | 0.6 | 0.7 | 0.7 |
| external HAZE | % | 7.0 | 10.5 | 18.6 | 7.0 | 10.8 |
| tanθ (face to face) | — | 2.42 | 1.66 | 1.23 | 2.43 | 1.74 |

TABLE 11-continued

| resin composition | | | Example 34 | Example 35 | Example 36 | Example 37 | Example 38 |
|---|---|---|---|---|---|---|---|
| tensile strength at break | MD | MPa | 52 | 47 | 48 | 45 | 51 |
| | TD | MPa | 43 | 45 | 44 | 46 | 40 |
| tensile elongation at break | MD | % | 674 | 631 | 629 | 631 | 664 |
| | TD | % | 667 | 656 | 627 | 682 | 639 |
| HS strength | | N/15 mm | 7.61 | 7.54 | 7.74 | 7.44 | 7.60 |
| Tp(50) | | % | 16.8 | 4.7 | 7.0 | 11.8 | 10.3 |
| Ra | | μm | 0.044 | 0.046 | 0.071 | 0.041 | 0.049 |
| Ry | | μm | 0.427 | 0.533 | 0.720 | 0.413 | 0.543 |

TABLE 12

| resin composition | | | Example 39 |
|---|---|---|---|
| LLDPE 2-1 | | % by weight | 80 |
| LLDPE 1-13 | | | 20 |
| resin pressure | | MPa | 27 |
| motor current | | A | 14 |
| resin density | | kg/m³ | 915.5 |
| total HAZE | | % | 20.1 |
| internal HAZE | | % | 0.7 |
| external HAZE | | % | 19.4 |
| tanθ (face to face) | | — | 1.31 |
| tensile | MD | MPa | 51 |
| strength at break | TD | MPa | 48 |
| tensile | MD | % | 645 |
| elongation at break | TD | % | 658 |
| HS strength | | N/15 mm | 7.73 |
| Tp(50) | | % | 14.6 |
| Ra | | μm | 0.070 |
| Ry | | μm | 0.693 |

TABLE 13

| resin composition | | | Example 40 | Example 41 | Example 42 | Comparative Example 1 |
|---|---|---|---|---|---|---|
| LLDPE 2-1 | | % by weight | 80 | 80 | 80 | 80 |
| LDPE 1 | | | | | | 20 |
| LDPE 2 | | | 10 | 15 | 10 | |
| LLDPE 1-10 | | | 10 | | | |
| LLDPE 1-11 | | | | 5 | 10 | |
| resin pressure | | MPa | 28 | 28 | 29 | 30 |
| motor current | | A | 13 | 13 | 13 | 14 |
| resin density | | kg/m³ | 914.8 | 914.5 | 914.8 | 915.0 |
| total HAZE | | % | 10.9 | 11.0 | 13.5 | 3.6 |
| internal HAZE | | % | 0.7 | 0.7 | 0.7 | 0.7 |
| external HAZE | | % | 10.2 | 10.3 | 12.8 | 2.9 |
| tanθ (face to face) | | — | 1.95 | 2.39 | 1.96 | unmeasurable |
| tensile strength at break | MD | MPa | 47 | 48 | 47 | 49 |
| | TD | MPa | 50 | 49 | 51 | 46 |
| tensile elongation at break | MD | % | 647 | 653 | 641 | 641 |
| | TD | % | 688 | 686 | 688 | 689 |
| HS strength | | N/15 mm | 7.47 | 7.74 | 7.64 | 7.15 |
| Tp(50) | | % | 12.3 | 25.1 | 9.9 | 44.4 |
| Ra | | μm | 0.050 | 0.059 | 0.056 | 0.028 |
| Ry | | μm | 0.493 | 0.670 | 0.567 | 0.250 |

TABLE 14

| resin composition | | | Example 18 | Example 19 |
|---|---|---|---|---|
| LLDPE 2-2 | % by | | 80 | 80 |
| LDPE 1 | weight | | 15 | 15 |
| LLDPE 1-1 | | | | |
| LLDPE 1-2 | | | | |
| LLDPE 1-3 | | | | |
| LLDPE 1-4 | | | 5 | |
| LLDPE 1-5 | | | | 5 |
| resin pressure | | MPa | 29 | 29 |
| motor current | | A | 12 | 12 |
| resin density | | kg/m$^3$ | 922.4 | 922.3 |
| total HAZE | | % | 10.0 | 8.9 |
| internal HAZE | | % | 1.0 | 0.9 |
| external HAZE | | % | 9.0 | 7.9 |
| tanθ (face to face) | | — | 0.90 | 0.96 |
| tensile | MD | MPa | 50 | 46 |
| strength | TD | MPa | 47 | 44 |
| at break | | | | |
| tensile | MD | % | 298 | 294 |
| elongation | TD | % | 319 | 305 |
| at break | | | | |

TABLE 15

| resin composition | | | Example 22 | Example 23 |
|---|---|---|---|---|
| LLDPE 2-2 | % by | | 80 | 80 |
| LDPE 2 | weight | | 15 | 15 |
| LLDPE 1-6 | | | 5 | |
| LLDPE 1-7 | | | | 5 |
| resin pressure | | MPa | 29 | 29 |
| motor current | | A | 13 | 13 |
| resin density | | kg/m$^3$ | 921.7 | 921.6 |
| total HAZE | | % | 11.7 | 11.3 |
| internal HAZE | | % | 1.2 | 1.3 |
| external HAZE | | % | 10.5 | 10.0 |
| tanθ (face to face) | | — | 0.97 | 1.00 |
| tensile | MD | MPa | 42 | 39 |
| strength | TD | MPa | 42 | 38 |
| at break | | | | |
| tensile | MD | % | 654 | 629 |
| elongation | TD | % | 699 | 674 |
| at break | | | | |

TABLE 16

| resin composition | | | Example 43 | Example 44 | Example 45 | Example 46 | Example 47 |
|---|---|---|---|---|---|---|---|
| LLDPE 2-2 | % by | | 80 | 80 | 80 | 80 | 80 |
| LDPE 1 | weight | | 15 | 10 | | 15 | 10 |
| LLDPE 1-10 | | | 5 | 10 | 20 | | |
| LLDPE 1-12 | | | | | | 5 | 10 |
| resin pressure | | MPa | 29 | 29 | 31 | 29 | 30 |
| motor current | | A | 13 | 14 | 14 | 13 | 14 |
| resin density | | kg/m$^3$ | 922.3 | 922.4 | 922.5 | 922.3 | 922.4 |
| total HAZE | | % | 8.6 | 10.8 | 14.5 | 10.7 | 13.3 |
| internal HAZE | | % | 1.2 | 1.1 | 0.9 | 1.1 | 1.0 |
| external HAZE | | % | 7.4 | 9.7 | 13.6 | 9.6 | 12.3 |
| tanθ (face to face) | | — | 0.84 | 0.78 | 0.77 | 0.89 | 0.81 |
| tensile | MD | MPa | 44 | 49 | 46 | 45 | 46 |
| strength | TD | MPa | 46 | 48 | 43 | 46 | 47 |
| at break | | | | | | | |
| tensile | MD | % | 674 | 697 | 653 | 673 | 676 |
| elongation | TD | % | 743 | 742 | 668 | 740 | 726 |
| at break | | | | | | | |
| HS strength | | N/15 mm | 0.14 | 0.15 | 0.11 | 0.12 | 0.11 |
| Tp(50) | | % | 6.7 | 8.6 | 19.9 | 4.6 | 6.5 |
| Ra | | μm | 0.033 | 0.044 | 0.043 | 0.042 | 0.053 |
| Ry | | μm | 0.370 | 0.463 | 0.470 | 0.523 | 0.550 |

TABLE 17

| resin composition | | | Example 48 |
|---|---|---|---|
| LLDPE 2-2 | | % by weight | 80 |
| LLDPE 1-12 | | | 20 |
| resin pressure | | MPa | 31 |
| motor current | | A | 14 |
| resin density | | kg/m$^3$ | 922.5 |
| total HAZE | | % | 20.1 |
| internal HAZE | | % | 1.0 |
| external HAZE | | % | 19.1 |
| tanθ (face to face) | | — | 0.76 |
| tensile | MD | MPa | 48 |
| strength | TD | MPa | 52 |
| at break | | | |
| tensile | MD | % | 675 |
| elongation | TD | % | 724 |
| at break | | | |
| HS strength | | N/15 mm | 0.10 |
| Tp(50) | | % | 16.0 |
| Ra | | μm | 0.077 |
| Ry | | μm | 0.797 |

TABLE 18

| resin composition | | Example 49 | Example 50 | Example 51 | Example 52 |
|---|---|---|---|---|---|
| LLDPE 2-2 | % by weight | 80 | 80 | 80 | 80 |
| LDPE 2 | | 15 | 10 | 15 | 10 |
| LLDPE 1-10 | | 5 | 10 | | |
| LLDPE 1-12 | | | | 5 | 10 |
| resin pressure | MPa | 28 | 29 | 29 | 30 |
| motor current | A | 13 | 13 | 13 | 13 |
| resin density | kg/m$^3$ | 921.7 | 922.0 | 921.7 | 922.0 |
| total HAZE | % | 12.0 | 12.8 | 13.0 | 15.4 |
| internal HAZE | % | 1.5 | 1.2 | 1.3 | 1.2 |
| external HAZE | % | 10.5 | 11.6 | 11.7 | 14.2 |
| tanθ (face to face) | — | 0.97 | 0.90 | 1.05 | 1.02 |
| tensile strength at break | MD MPa | 45 | 44 | 43 | 43 |
| | TD MPa | 49 | 48 | 46 | 47 |
| tensile elongation at break | MD % | 664 | 655 | 658 | 655 |
| | TD % | 722 | 740 | 747 | 729 |
| HS strength | N/15 mm | 0.12 | 0.12 | 0.12 | 0.12 |
| Tp(50) | % | 18.2 | 18.3 | 17.9 | 18.9 |
| Ra | μm | 0.049 | 0.050 | 0.060 | 0.064 |
| Ry | μm | 0.490 | 0.473 | 0.640 | 0.627 |

TABLE 19

| resin composition | | Comparative Example 2 | Comparative Example 3 |
|---|---|---|---|
| LLDPE 2-1 | % by weight | | |
| LLDPE 2-2 | | 80 | 80 |
| LDPE 1 | | 20 | |
| LDPE 2 | | | 20 |
| resin pressure | MPa | 29 | 28 |
| motor current | A | 13 | 13 |
| resin density | kg/m$^3$ | 922.2 | 921.4 |
| total HAZE | % | 6.2 | 9.8 |
| internal HAZE | % | 1.4 | 1.6 |
| external HAZE | % | 4.8 | 8.2 |
| tanθ (face to face) | — | 1.68 | 1.25 |
| tensile strength at break | MD MPa | 39 | 42 |
| | TD MPa | 41 | 41 |
| tensile elongation at break | MD % | 649 | 647 |
| | TD % | 707 | 713 |
| HS strength | N/15 mm | 0.09 | 0.15 |
| Tp(50) | % | 31.2 | 29.3 |
| Ra | μm | 0.028 | 0.047 |
| Ry | μm | 0.243 | 0.427 |

The present patent application claims priority to Japanese Patent Application No. 2017-045771 (filing date Mar. 10, 2017), which is incorporated herein by reference in its entirety into the present specification.

The invention claimed is:

1. A film comprising a resin component, wherein
a resin density is 900 kg/m$^3$ or more and 930 kg/m$^3$ or less, and
a load length ratio (Tp(50)) at cutting level 50% of a surface roughness curve of at least one film surface is 0.01% or more and 29.0% or less.

2. The film according to claim 1, wherein a resin density is 900 kg/m$^3$ or more and less than 920 kg/m$^3$.

3. The film according to claim 1, wherein a resin density is 920 kg/m$^3$ or more and 930 kg/m$^3$ or less.

4. The film according to claim 1, wherein the load length ratio (Tp(50)) at cutting level 50% of the surface roughness curve of at least one film surface is 0.05% or more and 26% or less.

5. The film according to claim 1, wherein a content of a lubricant and/or an anti-blocking agent is 200 ppm by weight or less.

6. A multi-layered film comprising a layer α composed of the film according to claim 1, wherein
at least one surface layer of two surface layers of the multi-layered film is the layer α.

7. The multi-layered film according to claim 6, comprising a layer β containing an ethylene-based polymer, wherein the layer β is different from the layer α.

8. The multi-layered film according to claim 6, comprising a layer β containing no ethylene-based polymer, wherein the layer β is different from the layer α.

9. A packaging container comprising the film according to claim 1.

10. A packaging container comprising the multi-layered film according to claim 6.

11. An ethylene-α-olefin copolymer comprising a monomer unit based on ethylene and a monomer unit based on an α-olefin having 3 to 20 carbon atoms, wherein a density is 915 kg/m$^3$ or more and 950 kg/m$^3$ or less, a melt flow rate measured under conditions of a temperature of 190° C. and a load of 21.18 N is 0.0001 g/10 min or more and 0.1 g/10 min or less, a zero shear viscosity at a temperature of 190° C. is 1×10$^5$ Pa·sec or more and 1×10$^7$ Pa·sec or less, a characteristic relaxation time is 10 seconds or more and 60 seconds or less, and a ratio of the z-average molecular weight to the weight-average molecular weight (Mz/Mw) is 2.2 or more and 3 or less.

12. An ethylene-α-olefin copolymer comprising a monomer unit based on ethylene and a monomer unit based on an α-olefin having 3 to 20 carbon atoms, wherein a density is 924 kg/m$^3$ or more and 945 kg/m$^3$ or less, a melt flow rate measured under conditions of a temperature of 190° C. and a load of 21.18 N is 0.0001 g/10 min or more and 0.1 g/10 min or less, a zero shear viscosity at a temperature of 190° C. is 1×10$^5$ Pa·sec or more and 1×10$^7$ Pa·sec or less, and a characteristic relaxation time is 10 seconds or more and 60 seconds or less.

13. An ethylene-α-olefin copolymer comprising a monomer unit based on ethylene and a monomer unit based on an α-olefin having 3 to 20 carbon atoms, wherein a density is 915 kg/m$^3$ or more and 950 kg/m$^3$ or less, melt flow rate measured under conditions of a temperature of 190° C. and a load of 21.18 N is 0.0001 g/10 min or more and 0.05 g/10 min or less, a zero shear viscosity at a temperature of 190° C. is $1\times10^5$ Pa·sec or more and $1\times10^7$ Pa·sec or less, and the characteristic relaxation time is 10 seconds or more and 60 seconds or less.

* * * * *